US010202208B1

(12) United States Patent
Sanyal et al.

(10) Patent No.: US 10,202,208 B1
(45) Date of Patent: Feb. 12, 2019

(54) HIGH CONTROL AUTHORITY VARIABLE SPEED CONTROL MOMENT GYROSCOPES

(71) Applicant: Arrowhead Center, Inc., Las Cruces, NM (US)

(72) Inventors: Amit K. Sanyal, Manlius, NY (US); Sasi Viswanathan, Syracuse, NY (US)

(73) Assignee: Arrowhead Center, Inc., Las Cruces, NM (US)

( * ) Notice: Subject to any disclaimer, the term of this patent is extended or adjusted under 35 U.S.C. 154(b) by 379 days.

(21) Appl. No.: 14/605,935

(22) Filed: Jan. 26, 2015

Related U.S. Application Data

(60) Provisional application No. 61/931,423, filed on Jan. 24, 2014, provisional application No. 61/932,675, (Continued)

(51) Int. Cl.
 *B64G 1/28* (2006.01)
 *G01C 19/56* (2012.01)

(52) U.S. Cl.
 CPC ............ *B64G 1/286* (2013.01); *G01C 19/56* (2013.01)

(58) Field of Classification Search
 CPC ...................................... B64G 1/286
 See application file for complete search history.

(56) References Cited

U.S. PATENT DOCUMENTS 2,052,507 A  8/1936 Walton
3,526,145 A * 9/1970 Riordan ............. G01C 19/02
 73/504.09
(Continued)

FOREIGN PATENT DOCUMENTS

CN  100367137 C  2/2008
CN  102901492 A  1/2013
(Continued)

OTHER PUBLICATIONS

Bloch, et al., "Geometric Structure-Preserving Optimal Control of a Rigid Body", Journal of Dynamical and Control Systems, 2009, 307-330.

(Continued)

*Primary Examiner* — Terence Boes
(74) *Attorney, Agent, or Firm* — Peacock Law P.C.; Philip D. Askenazy; Deborah A. Peacock

(57) ABSTRACT

A variable speed control moment gyroscope (VSCMG) having a desired offset between the center of mass of the gimbal frame and the center of mass of the flywheel. This gives the VSCMG a higher control authority than an otherwise identical VSCMG without the desired offset at identical gimbal and flywheel rotation rates. Thus the VSCMG generates more angular momentum and torque than an otherwise identical VSCMG without the desired offset at identical gimbal and flywheel rotation rates and per the same unit power consumption. The VSCMG can be operated without any control singularities in a map between the gimbal rate and/or the flywheel rate and the angular momentum or torque produced by the VSCMG. The desired offset is typically at least an order of magnitude greater than an offset between the center of mass of the gimbal frame and the center of mass of the flywheel occurring during manufacture of the VSCMG due to manufacturing tolerances.

9 Claims, 11 Drawing Sheets

Related U.S. Application Data filed on Jan. 28, 2014, provisional application No. 62/024,351, filed on Jul. 14, 2014.

(56) References Cited

U.S. PATENT DOCUMENTS

| | | | |
|---|---|---|---|
| 3,941,001 A | 3/1976 | Lasarge | |
| 6,135,392 A * | 10/2000 | Wakugawa | B64G 1/283 244/164 |
| 6,681,649 B2 | 1/2004 | Hyde et al. | |
| 6,834,561 B2 | 12/2004 | Meffe | |
| 7,364,120 B2 | 4/2008 | Peck | |
| 7,661,627 B2 | 2/2010 | Defendini et al. | |
| 9,850,009 B2 * | 12/2017 | Verbin | B64G 1/286 |
| 2013/0125667 A1 * | 5/2013 | Fitz-Coy | B64G 1/286 73/862.041 |
| 2014/0260714 A1 | 9/2014 | Heike et al. | |
| 2016/0107769 A1 * | 4/2016 | Verbin | G01C 19/30 244/165 |

FOREIGN PATENT DOCUMENTS

| | | |
|---|---|---|
| CN | 102323825 B | 5/2013 |
| CN | 103197669 A | 7/2013 |
| CN | 103592848 A | 2/2014 |
| EP | 0544242 B1 | 6/1993 |
| EP | 0916576 A2 | 5/1999 |
| GB | 191508760 A | 3/1919 |
| GB | 225518 A | 3/1925 |
| KR | 100552583 B1 | 2/2006 |
| KR | 1020110134141 A | 12/2011 |
| KR | 1020120032248 A | 4/2012 |
| WO | 2014157798 A1 | 10/2014 |

OTHER PUBLICATIONS

Bloch, "Nonholonomic Mechanics and Control", No. 24 in Interdisciplinary Texts in Mathematics, 2003, 119-174.
Bloch, et al., "Stabilization of Rigid Body Dynamics by Internal and External Torques", Automatica, 28(4), 1992, 745-756.
Bredon, "Topology and Geometry", No. 139 in Graduate Texts in Mathematics. Springer Verlag., 1993, 106-111.
Chaturvedi, et al., "Rigid-Body Attitude Control Using Rotation Matrices for Continuous, Singularity-Free Control Laws", IEEE Control System Magazine, vol. 31(3), 2011, 30-51.
Davis, et al., "Methods of Numerical Integration", 1st ed. Computer Science and Applied Mathematics, 1975, 261.
Defendini, et al., "Control Moment Gyro CMG 15-45 S: A Compact CMG Product for Agile Satellites in the One Ton Class", In 10th European Space Mechanisms and Tribology Symposium, R.A. Harris, ed., vol. 524 of ESA Special Publication, 2003, 27-31.
Ford, et al., "Singular Direction Avoidance Steering for Control-Moment Gyros", Journal of Guidance, Control, and Dynamics, vol. 23, No. 4, Jul.-Aug. 2000 (presented as Paper 28-4470 at the AIAA Astrodynamics Specialist Conference, Boston, MA. Aug. 10-12, 1998).
Hairer, et al., "Geometric Numerical Integration", Springer Verlag, 2000, 4-6.
Hughes, "Spacecraft Attitude Dynamics", J. Wiley, 1986, 160-161.
Hussein, et al., "A Discrete Variational Integrator for Optimal Control Problems on SO(3)", Decision and Control, 2006, 6636-6641.
Iserles, et al., "Lie-Group Methods", Acta Numerica, 2000, 215-365.
Kim, et al., "New Startup Method Using Internal Momentum Management of Variable-Speed Control Moment Gyroscopes", Journal of Guidance, Control, and Dynamics, 2012.
Kurokawa, "A Geometric Study of Single Gimbal Control Moment Gyros (Singularity Problems and Steering Law)", Tech. Rep. 175, Agency of Industrial Technology and Science, 1998.

Lappas, et al., "Practical Results on the Development of a Control Moment Gyro based Attitude Control System for Agile Small Satellites", http://www.digitalcommons.usu-edu/cgi/viewcontent.cgi?article=1927&context=smallsat, 2002.
Lappas, et al., "Torque amplification of control moment gyros", Electronics Letters, 2002, 837-839.
Lee, et al., "A Lie Group Variational Integrator for the Attitude Dynamics of a Rigid Body with Applications to the 3D Pendulum", Proc of IEEE Conf. on Control Applications, Aug. 28-31, 2005, 962-967.
Lee, et al., "Satellite Dynamics Simulator Development Using Lie Group Variational Integrator", AIAA 2011-6430, AIAA Modeling and Simulation Technologies Conference, Aug. 8-11, 2011.
Leve, et al., "Hybrid Steering Logic for Single-Gimbal Control Moment Gyroscopes", Journal of Guidance, Control, and Dynamics, 2010, 1202-1212.
MacKunis, et al., "Adaptive Satellite Attitude Control in the Presence of Inertia and CMG Gimbal Friction Uncertainties", The Journal of the Astronautical Sciences, vol. 56, No. 1, Jan.-Mar. 2008 (presented as paper AIAA 2007-6432 at the 2007 AIAA Guidance, Navigation, and Control Conference in Hilton Head, SC, Aug. 20-23, 2007, 121-134.
Margulies, et al., "Geometric Theory of Single-Gimbal Control Moment Gyro Systems", Journal of the Astronautical Sciences, 1978, 159-191.
Marsden, et al., "Discrete Mechanics and Variational Integrators", Acta Numerica, 10, 2001, 357-514.
Marsden, et al., "Introduction to Mechanics and Symmetry", 2 ed. Springer Verlag, New York., 1999, 219-264.
Marsden, "Lectures on Mechanics", Cambridge University Press, New York, 1992, 135-136.
McMahon, et al., "Simplified Singularity Avoidance Using Variable Speed Control Moment Gyroscope Nullmotion", AIAA Journal of Guidance, Control and Dynamics, 2009, 1938-1943.
Moser, et al., "Discrete Versions of Some Classical Integrable Systems and Factorization of Matrix Polynomials", Commun. Math. Phys., 1991, 217-243.
Murray, et al., "A Mathematical Introduction to Robotic Manipulation", http://www.cds.caltech.edu/~murray/mlswiki, 1994, 26.
Paradiso, "A Search-Based Approach to Steering Single Gimbaled CMGs.", Tech. Rep. CSDL-R-2261, Draper Laboratory Technical Report, 1991.
Paradiso, "Global Steering of Single Gimballed Control Moment Gyroscopes Using a Directed Search", Presented at the 1991 AIAA Guidance and Control Conf., New Orleans, LA as Paper 91-2718, http://www.web.media.mit.edu/~joep/papers/AIAA-CMG-Paper.pdf, 1991.
Romano, et al., "Attitude Dynamics/Control of Dual-Body Spacecraft with Variable-Speed Control Moment Gyros", Journal of Guidance, Control, and Dynamics, 2004.
Sanyal, et al., "Dynamics and Control of a Rigid Spacecraft with a Control Moment Gyroscope", http://web.nmsu/~sashi/cmg.pdf, 2012.
Sanyal, et al., "Global Optimal Attitude Estimation Using Uncertainty Ellipsoids", Systems and Control Letters, 2008, 236-245.
Schaub, et al., "Analytical Mechanics of Space Systems", 2nd ed. AIAA Education Series, Reston, VA, Oct. 2009, 178-179.
Schiehlen, "Two Different Approaches for a Control Law of Single Gimbal Control Moment Gyros", Tech. Rep. NASA-TM-X-64693, NASA-Marshall Space Flight Center, 1972.
Sun, et al., "Analysis of Inertia Dyadic Uncertainty for Small Agile Satellite with Control Moment Gyros", International Conference on Mechatronics and Automation, 2010, 813-818.
Tokar, et al., "Singular Surfaces in Unsupported Gyrodyne Systems", Cosmic Research, 1979, 547-555.
Virgala, et al., "Friction Effect Analysis of a DC Motor", American Journal of Mechanical Engineering, 1(1), 2013, 1-5.
Wang, et al., "Gyroscopic Control and Stabilization", Journal of Nonlinear Science, 2, 1992, 367-415.
Wie, "New Singularity Escape/Avoidance Steering Logic for Control Moment Gyro Systems", AIAA 2003-5659, AIAA Guidance, Navigation, and Control Conference and Exhibit, Aug. 11-14, 2003.

(56) References Cited

OTHER PUBLICATIONS

Wie, "Space Vehicle Dynamics and Control", Second Edition, American Institute of Aeronautics and Astronautics, Inc., 2008, 436-437.

Yoon, et al., "Singularity Analysis and Avoidance of Variable-Speed Control Moment Gyros-Part I: No Power Constraint Case", http://www.dcsl.gatech.edu/papers/aas04a.pdf, 2004.

Yoon, et al., "Singularity Analysis and Avoidance of Variable-Speed Control Moment Gyros-Part II: Power Constraint Case", http://www.dcsl.gatech.edu/papers/aas04b.pdf, 2004.

Yoon, et al., "Singularity Analysis of Variable Speed Control Moment Gyros", AIAA Journal of Guidance, Control and Dynamics, 27(3), 2004, 374-386.

Yoon, et al., "Spacecraft Adaptive Attitude and Power Tracking with Variable Speed Control Moment Gyroscopes", AIAA Journal of Guidance, Control and Dynamics, 2002, 1081-1090.

Yoon, et al., "Spacecraft Line-of-Sight Control Using a Single Variable-Speed Control Moment Gyro", Journal of Guidance, Control, and Dynamics, May 6, 2006.

\* cited by examiner

| Parameter | Value | Units | Description |
|---|---|---|---|
| $n$ | 3 | - | No. of VSCMG |
| $J_b$ | $1.7 \times I_{3 \times 3}$ | kg-m² | Base-body inertia |
| $J_r$ | diag [0.6 1 0.6]×10⁻³ | kg-m² | Rotor inertia in its body frame |
| $J_g$ | diag [1 0.1 1]×10⁻³ | kg-m² | Gimbal inertia in its body frame |
| $m_b$ | 29.42 | kg | Base-body mass |
| $m_r$ | 0.88 | kg | Rotor mass |
| $m_g$ | 0.65 | kg | Gimbal mass |
| $\beta$ | 30° | degree | Skew angle |
| $\dot{\Gamma}_p$ | $[0\ -60\ 0\ 45\ 0\ 55]^T$ | rad/s | Preferred VSCMG rate |
| $t_f$ | 600 | sec | Final time |
| $h$ | 0.001 | - | Time step |

FIG. 7

HIGH CONTROL AUTHORITY VARIABLE SPEED CONTROL MOMENT GYROSCOPES

CROSS-REFERENCE TO RELATED APPLICATIONS

This application claims priority to and the benefit of filing of the following U.S. Provisional Patent Applications: Ser. No. 61/931,423, entitled "High Control Authority Variable Speed Control Moment Gyroscope", filed on Jan. 24, 2014, Ser. No. 61/932,675, entitled "High Control Authority Variable Speed Control Moment Gyroscope", filed on Jan. 28, 2014, and Ser. No. 62/024,351, entitled "High Control Authority Variable Speed Control Moment Gyroscope", filed on Jul. 14, 2014, and the specifications and claims of those applications are incorporated herein by reference.

BACKGROUND OF THE INVENTION

Field of the Invention (Technical Field):

The attitude dynamics of a spacecraft with an actuated variable speed control moment gyroscope (VSCMG), is derived using the principles of variational mechanics. The model of the VSCMG preferably comprises an offset between the gimbal frame's center of mass and the flywheel or rotor's center of mass. The dynamics equations show the complex nonlinear coupling between the internal degrees of freedom associated with the VSCMG and the spacecraft base body's attitude degrees of freedom. This dynamics model is then further generalized to include the effects of multiple VSCMGs placed in the spacecraft base body, and sufficient conditions for non-singular VSCMG configurations are obtained. A control scheme using a finite number of VSCMGs for attitude stabilization maneuvers in the absence of external torques and when the total angular momentum of the spacecraft is zero is presented. Embodiments of the present VSCMGs optionally utilize inertia variations of the gimbal on which the flywheel is mounted. These gyroscopes can be used for attitude actuation in space vehicles, including small spacecraft, for precise pointing control, re-orientation, and detumbling maneuvers. It can be used in both government agency-sponsored missions (for example for NASA, ESA, JAXA, ISRO, etc.) and the commercial space industry. Because of the optimization of control authority with respect to the same control inputs, embodiments of the present invention can be used for automobiles, robotics, health care (balance assistance), in addition to attitude control for spacecraft, astronauts (such as those on a spacewalk), and maritime vehicles.

Background Art:

Note that the following discussion may refer to a number of publications and references. Discussion of such publications herein is given for more complete background of the scientific principles and is not to be construed as an admission that such publications are prior art for patentability determination purposes.

Internal momentum exchange devices can be used as spacecraft attitude actuators to stabilize a desired attitude or track a desired attitude profile. A Control Moment Gyroscope (CMG) is a momentum exchange device consisting of a rotor running at a constant angular speed, mounted on a gimbal frame structure that can be rotated at a controlled rate. CMGs are used to generate the required momentum for attitude (orientation) control of spacecraft, including attitude stabilization of agile spacecraft. They can be categorized as Single Gimbal Control Moment Gyroscopes (SGCMGs) or Double Gimbal Control Moment Gyroscopes (DGCMGs). A Variable Speed Control Moment Gyroscope (VSCMG) combines the features of a constant speed SGCMG with a rotor whose angular speed can be varied. Defining features and comparisons between SGCMGs and DGCMGs are given in Wie, B., 2008, Space Vehicle Dynamics and Control, 2nd ed. American Institute of Aeronautics and Astronautics, Reston, Va. VSCMGs are described in Schaub, H., and Junkins, J. L., 2009. Analytical Mechanics of Space Systems, 2nd ed. AIAA Education Series, Reston, Va., October; McMahon, J., and Schaub, H., 2009. "Simplified singularity avoidance using variable speed control moment gyroscope nullmotion". AIAA Journal of Guidance, Control, and Dynamics, 32(6), Nov.-Dec., pp. 1938-1943; and Yoon, H., and Tsiotras, P., 2002. "Spacecraft adaptive attitude and power tracking with variable speed control moment gyroscopes". AIAA Journal of Guidance, Control and Dynamics, 25, pp. 1081-1090.

Single Gimbal CMGs typically produce larger torques for the same actuator mass compared to reaction wheels. However, the dynamics of CMGs is more complex than that of reaction wheels, with inherent singularities in the map between the inputs (gimbal rates) and outputs (angular momentum or torque acting on spacecraft bus) (i.e. the CMG cannot produce a desired control torque vector). Most of the available steering laws that locally produce instantaneous control torques, have difficulties avoiding singularities in minimally redundant SGCMG systems. Most of the existing (VS)CMG dynamics models use some simplifying assumptions in their formulation. These assumptions are: (1) the offset between the rotor center of mass (CoM) and the gimbal axis (or CoM) in the direction of the rotor's rotation axis is zero i.e., $\sigma=0$; (2) both the gimbal and the rotor-fixed coordinate frames are their corresponding principal axes frames, the rotor is axisymmetric, and both rotor and gimbal inertias are about their respective center of masses (i.e., $J_r = J_{r_{CoM}}$ and $J_g = J_{g_{CoM}}$); (3) the gimbal frame structure has "negligible" inertia (i.e., $J_g \approx 0$); (4) the angular rate of the gimbal frame is much smaller ("negligible") compared to the rotor angular rate about its symmetry axis (i.e., $\dot{\alpha}(t) \ll \dot{\theta}(t)$); and (5) for a CMG, the speed of the rotor $\dot{\theta}$ is constant (i.e., the VSCMG is operated as a standard SGCMG).

In the present invention, a more general dynamics model of a spacecraft with VSCMG is obtained without using most or any of these assumptions. Since the configuration space of attitude motion of a spacecraft with internal actuators is a nonlinear manifold, the global dynamics of this system is preferably treated using the formulation of geometric mechanics. This model is obtained using variational mechanics, and in the framework of geometric mechanics on the nonlinear state space of this system. The dynamics model is thereafter generalized to a spacecraft with a finite number of VSCMGs. The dynamics model obtained here is applicable to VSCMGs with non-axisymmetric rotors and gimbals, where the rotation axis of the rotor may be offset from the center of mass of the gimbal structure. While it is true that existing VSCMG designs may not require these properties when manufactured, it is possible that during installation within a spacecraft bus or during the course of operations they become misaligned, in which case this generalized model and the control schemes based on it would still apply.

SUMMARY OF THE INVENTION (DISCLOSURE OF THE INVENTION)

The present invention is a variable speed control moment gyroscope (VSCMG) comprising a gimbal frame, a flywheel, and a desired offset between the center of mass of the gimbal frame and the center of mass of the flywheel. The VSCMG preferably comprises a higher control authority than an otherwise identical VSCMG without the desired offset at identical gimbal and flywheel rotation rates. The VSCMG preferably generates more angular momentum and torque than an otherwise identical VSCMG without the desired offset at identical gimbal and flywheel rotation rates and preferably generates more angular momentum and torque per unit power consumption than an otherwise identical VSCMG without the desired offset. Angular momentum and torque produced by the VSCMG preferably increases with the distance of the VSCMG from the center of mass of a spacecraft bus. The desired offset is preferably in the direction of the flywheel's rotation axis. The gimbal coordinate frame is preferably not the same as its principal axis frame. The flywheel fixed coordinate frame is preferably not the same as its principal axis frame. The flywheel is preferably not axisymmetric. The flywheel inertia is preferably not about the center of mass of the flywheel. The gimbal inertia is preferably not about the center of mass of the gimbal frame. The inertia of the gimbal frame is preferably not negligible or approximately zero. The angular rate of the gimbal frame is preferably not negligible compared to the angular rate of the flywheel about its symmetry axis. The VSCMG preferably does not comprise a control singularity in a map between the gimbal rotation rate and/or the flywheel rotation rate and angular momentum or torque produced by the VSCMG. The desired offset is preferably at least an order of magnitude greater than an offset between the center of mass of the gimbal frame and the center of mass of the flywheel occurring during manufacture of the VSCMG due to manufacturing tolerances. The desired offset is preferably specified in the design of the VSCMG.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate embodiments of the present invention and, together with the description, serve to explain the principles of the invention. The drawings are only for the purpose of illustrating embodiments of the invention and are not to be construed as limiting the invention. In the drawings:

FIG. 7 is a table of simulation parameters.

DETAILED DESCRIPTION OF EMBODIMENTS OF THE INVENTION

Control moment gyroscopes are used inside spacecraft for fine pointing control and other maneuvers requiring a change in the spacecraft's orientation. Variable speed control moment gyroscopes (VSCMGs) typically comprise a flywheel or rotor whose rotation speed can be varied and whose rotation axis is mounted orthogonal to a gimbal; this gimbal is typically rotated about an axis fixed in the spacecraft body. Most manufactured CMGs have small offsets between the center of mass of the gimbal on which the flywheel is mounted, and the center of mass of the flywheel itself. It is difficult to ensure that these center of mass locations match up exactly. Embodiments of the present invention are novel hardware designs and associated control software for a VSCMG that includes Inertia variations of the gimbal on which the flywheel is mounted, taking into account the mass and rotational inertia of the gimbal frame structure. There is preferably an offset between the center of the rotor and the center of the gimbal axis, which increases the control authority for attitude maneuvers of the spacecraft. In the existing technical literature on the dynamics and controls of spacecraft with single gimbal CMG, the effects of the mass and inertia of the gimbal frame, the offset of center of mass of the rotor from the gimbal rotation axis, and the angular rate and angular acceleration of the gimbal, are not considered significant. However, these parameters can have significant effect on the rotation rates of the flywheel and the gimbal required for typical spacecraft de-tumbling and reorientation maneuvers, leading to as large as a 20% change in the rotation rates for spacecraft de-tumbling maneuvers for micro- and nano-spacecraft. The present VSCMG hardware design and software control scheme is based on an accurate dynamics model without unnecessary assumptions that lead to control singularities in other designs. In particular, embodiments of the present VSCMG design require smaller gimbal and flywheel rotation rates to provide the same control authority on the spacecraft bus for a typical spacecraft de-tumbling maneuver, compared with existing designs.

Attitude Kinematics of a Spacecraft with One VSCMG

Figure 1A:
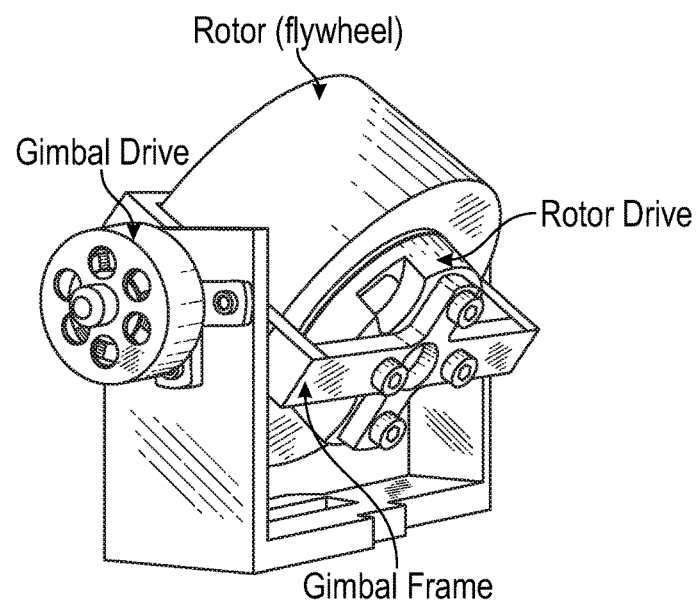
FIG. 1a is a CAD rendering of an embodiment of a VSCMG comprising an axisymmetric rotor.
Figure 1B:
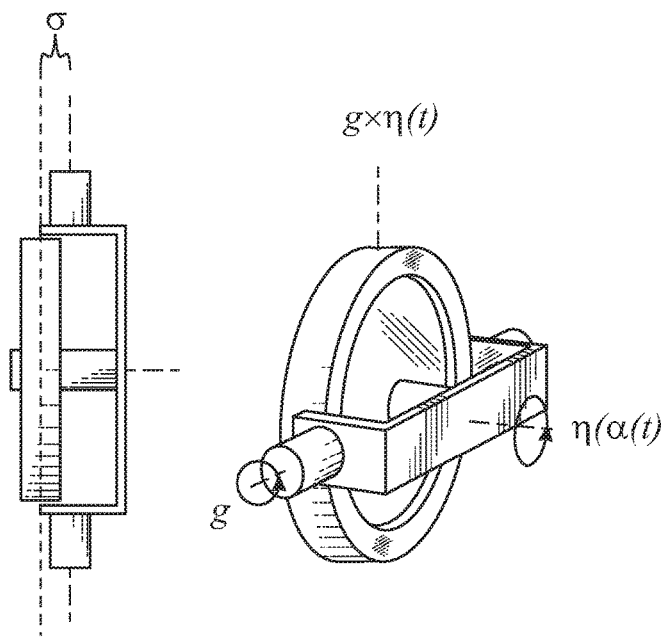
FIGS. 1b and 1c are vector representations of VSCMG axes, with the rotor offset in the axial direction $\eta(\alpha(t))$ from the center of mass of the gimbal about its axis g.
Figure 1C:
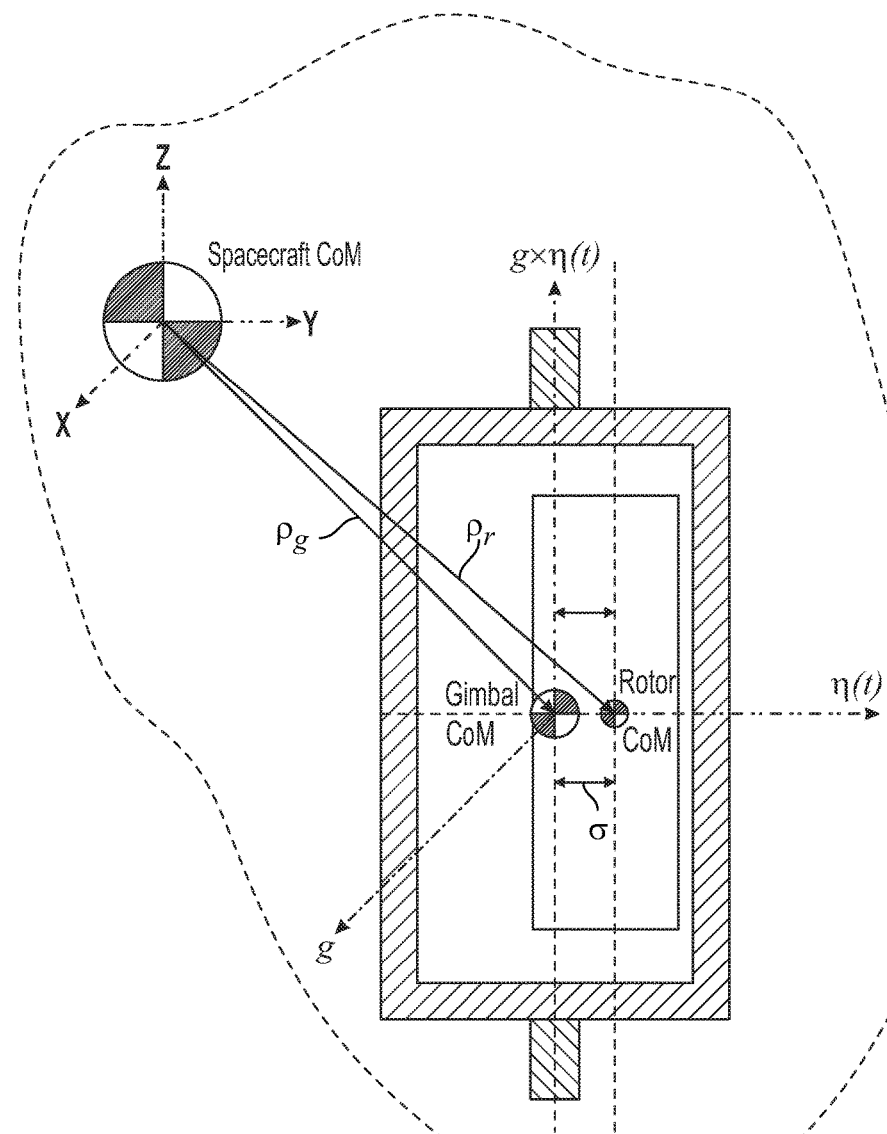

The dynamics model of a spacecraft with a single VSCMG is formulated. The gimbal axis of the VSCMG is orthogonal to the rotor's axis of rotation, which passes through its center of mass. There is a scalar offset along the rotor axis between the centers of mass of the gimbal and the rotor; this offset is denoted $\sigma$. A schematic CAD rendering of a VSCMG assembly, is shown in FIG. 1a. Consider a right-handed coordinate frame fixed to the center of mass of the spacecraft base body (spacecraft bus), which has a VSCMG as an internal attitude actuator. The attitude of the spacecraft is given by the rotation matrix from this base body-fixed coordinate frame to an inertially fixed coordinate frame. Consider the gimbal of the VSCMG to rotate about an axis fixed with respect to this spacecraft base body coordinate frame. Let $g \in \mathbf{S}^2$ denote the fixed axis of rotation of the gimbal, and let $\eta(\alpha(t)) \in \mathbf{S}^2$ denote the instantaneous direction of the axis of rotation of the rotor at time instant t, both expressed as unit vectors in the base body coordinate frame. By construction, $\eta(\alpha(t))$ is normal to the fixed gimbal axis g. Let $\sigma$ be the distance of the center of rotation of the rotor from the center of mass of the gimbal; this distance is assumed to be along the vector $\eta(\alpha(t))$. Define a VSCMG gimbal-fixed coordinate frame with its first coordinate axis along g, its second axis along $\eta(\alpha(t)$ and its third axis along $g \times \eta(\alpha(t))$, to form a right-handed orthonormal triad of basis vectors as depicted in FIG. 1b.

Rotational Kinematics

Let $\alpha(t)$ represent the gimbal angle, which is the rotation angle of rotor axis $\eta$ about the gimbal axis g. Therefore, if $\eta_0$ denotes the initial rotor axis direction vector with respect to the base body frame, the rotor axis at time t>0 is given by $$\eta(\alpha(t)) = \exp(\alpha(t)g^\times)\eta(0) = \cos\alpha(t)\eta_0 + \sin\alpha(t)(g \times \eta_0), \quad (1)$$

using Rodrigues' rotation formula. Let $R_g$ denote the rotation matrix from the VSCMG gimbal-fixed coordinate frame to the spacecraft base body coordinate frame, which can be expressed as $$R_g(\alpha(t)) = [g \; \eta(\alpha(t)) \; g \times \eta(\alpha(t))]. \quad (2)$$

The time rate of change of the rotor axis $\eta(\alpha(t))$ is given by $$\dot{\eta}(\alpha(t), \dot{\alpha}(t)) = \dot{\alpha}(t)(\cos\alpha(t)(g \times \eta_0) - \sin\alpha(t)\eta_0) = \dot{\alpha}(t)g^\times \eta(\alpha(t)). \quad (3)$$

where the map $(\cdot)^\times : \mathbb{R}^3 \to \mathbf{S}(3)$ is the vector space isomorphism $\in \mathbb{R}^3$ and $\in \mathbf{so}(3)$, given by:

$$g^\times = \begin{bmatrix} g_x \\ g_y \\ g_z \end{bmatrix}^\times = \begin{bmatrix} 0 & -g_z & g_y \\ g_z & 0 & -g_x \\ -g_y & g_x & 0 \end{bmatrix}.$$

The time derivative of $R_g$ is then given by $$\dot{R}_g(\alpha(t), \dot{\alpha}(t)) = [0 \mid \dot{\alpha}(t)g \times \eta(\alpha(t)) \mid g \times \dot{\eta}(\alpha(t))] \quad (4)$$
$$= [0 \mid \dot{\alpha}(t)g \times \eta(\alpha(t)) \mid g \times (\dot{\alpha}(t)g \times \eta(\alpha(t)))]$$

Using the vector triple product $(a^\times b^\times c = (a^T c)b - (a^T b)c)$ identity in the last step above, the above can also be expressed as $$\dot{R}_g(\alpha(t), \dot{\alpha}(t)) = R_g(\alpha(t))[0 \mid \dot{\alpha}(t)e_3 \mid -\dot{\alpha}(t)e_2] = \dot{\alpha}(t)R_g(\alpha(t))e_1^\times, \quad (5)$$

where $e_1 = [1 \; 0 \; 0]^T$, $e_2 = [0 \; 1 \; 0]^T$ and $e_3 = [0 \; 0 \; 1]^T$ are the standard basis vectors (as column vectors) of $\mathbb{R}^3$. Since $e_1$ denotes the gimbal axis in the gimbal-fixed frame, the angular velocity of the gimbal-fixed frame with respect to the base body, expressed in the base body frame, is $$\omega_g(t, \dot{\alpha}) = \dot{\alpha}(t)g. \quad (6)$$

Let $\theta(t)$ denote the instantaneous angle of rotation of the rotor about its symmetry axis $\eta(\alpha(t))$; this is the angle between the first axis of a VSCMG rotor-fixed coordinate frame and the gimbal axis, where the rotor axis forms the second coordinate axis of this coordinate frame. For a VSCMG, the angular speed of the rotor $\dot{\theta}(t)$ is time-varying and a constant rotor rate corresponds to a CMG. The rotation matrix from this VSCMG rotor-fixed coordinate frame to the base body coordinate frame is $$R_r(\alpha(t), \theta(t)) = R_g(\alpha(t))\exp(\theta(t)e_2^\times). \quad (7)$$

The time rate of change of the rotation matrix $R_r$ is obtained as follows:

$$\dot{R}_r(\alpha(t), \theta(t), \dot{\alpha}(t), \dot{\theta}(t)) = \dot{R}_g(\alpha(t), \dot{\alpha}(t))\exp(\theta(t)e_2^\times) + R_g(\alpha(t))\exp(\theta(t)e_2^\times)\dot{\theta}(t)e_2^\times$$
$$= \dot{\alpha}(t)R_r(\alpha(t), \theta(t))(\exp(-\theta(t)e_2^\times)e_1)^\times + R_r(\alpha(t), \theta(t))\dot{\theta}(t)e_2^\times,$$

using the fact that $R^T a^\times R = (R^T a)^\times$ for $R \in SO(3)$ and $a \in \mathbb{R}^3$. It can be verified that the following holds for $\phi \in \mathbf{S}^1$:

$$\exp(\phi e_2^\times)e_1 = (\cos\phi)e_1 - (\sin\phi)e_3.$$

Making use of this identity, the time derivative of $R_r$ can be expressed as $$\dot{R}_r(\alpha(t), \theta(t), \dot{\alpha}(t), \dot{\theta}(t)) = R_r(\alpha(t), \theta(t))(\dot{\alpha}(t)((\cos(\theta(t))e_1 + (\sin\theta(t))e_3) + \dot{\theta}(t)e_2^\times).$$

Therefore, the angular velocity of the VSCMG rotor with respect to the base body, expressed in the base body frame, is $$\omega_r(\alpha(t), \dot{\alpha}(t), \dot{\theta}(t)) = R_r(\alpha(t), \theta)(\dot{\alpha}(t)((\cos\theta(t))e_1 + (\sin\theta(t))e_3) + \dot{\theta}(t)e_2) \quad (8)$$
$$= \dot{\alpha}(t)R_g(\alpha(t))e_1 + \dot{\theta}(t)R_g(\alpha(t))e_2$$
$$= \dot{\alpha}(t)g + \dot{\theta}(t)\eta(\alpha(t)).$$

Let R(t) denote the rotation matrix from the base body-fixed coordinate frame to an inertial coordinate frame. If $\Omega(t)$ is the total angular velocity of the base body with respect to the inertial frame and expressed in the base body frame, then the attitude kinematics of the base body is given by $$\dot{R}(t) = R(t)\Omega(t)^\times. \quad (9)$$

Let $\rho_g$ denote the position vector from the center of mass of the base-body to the center of mass of the gimbal, expressed in the base body frame. The position vector from the center of mass of the base-body to the center of mass of the rotor is therefore given by $\rho_r(\alpha(t)) = \rho_g + \sigma\eta(\alpha(t))$ in the base body frame. These vectors can be expressed in the inertial frame as $$r_g(R(t)) = R(t)\rho_g \text{ and } r_r(R(t), \alpha(t)) = R(t)\rho_r(\alpha(t)).$$

Thus, the inertial velocities of these centers of masses with respect to the base-body center of mass are given by $$\dot{r}_g(R(t), \Omega(t)) = R(t)\Omega(t)^\times \rho_g \text{ and } \dot{r}_r(R(t), \Omega(t), \alpha(t), \dot{\alpha}(t)) = R(t)(\Omega(t)^\times \rho_r(\alpha(t)) + \sigma\dot{\alpha}(t)g^\times\eta(\alpha(t))). \quad (10)$$

The spacecraft with a VSCMG has five rotational degrees of freedom, which are described by the variables $\alpha$, $\theta$ and R.

The configuration space Q of this system has the structure of a principal (fiber) bundle with base space $B=\mathbb{T}^2=\mathbf{S}^1\times\mathbf{S}^1$ and fiber $G=SO(3)$.

Lagrangian Dynamics: The Lagrangian of a Spacecraft with One VSCMG

The dynamics model of a spacecraft with a VSCMG is developed in this section. The generalized model of a VSCMG consists of a rotor of mass $m_r$ and inertia matrix $J_r$ about its center of mass; this rotor is mounted on a gimbal structural frame of mass $m_g$ and inertia matrix $J_g$ about its center of mass. For notational convenience, the time-dependence of variables are not explicitly denoted, i.e., $\Omega=\Omega(t)$, $R_g(\alpha)=R_g(\alpha(t))$, $\dot{r}_r(\alpha, \dot{\alpha})=\dot{r}_r(\alpha(t), \dot{\alpha})$ etc. Therefore, the total rotational kinetic energy of the gimbal (alone) is $$T_g(\Omega, \alpha, \dot{\alpha}) = \frac{1}{2}(\Omega+\omega_g(\dot{\alpha}))^T R_g(\alpha) J_g R_g(\alpha)^T (\Omega+\omega_g(\dot{\alpha})) + \frac{1}{2} m_g \dot{r}_g^T \dot{r}_g, \quad (11)$$

and the total rotational kinetic energy of the rotor (alone) is $$T_r(\Omega, \alpha, \dot{\alpha}, \theta, \dot{\theta}) = \qquad (12)$$
$$\frac{1}{2}(\Omega+\omega_r(\alpha, \dot{\alpha}, \dot{\theta}))^T R_r(\alpha, \theta) J_r R_r(\alpha, \theta)^T (\Omega+\omega_r(\alpha, \dot{\alpha}, \dot{\theta})) +$$
$$\frac{1}{2} m_r \dot{r}_r(\alpha, \dot{\alpha})^T \dot{r}_r(\alpha, \dot{\alpha})$$

Let $J_b$ denote the inertia matrix of the base body expressed in the base body frame. The rotational kinetic energy of the base body of the spacecraft is $$T_b(\Omega) = \frac{1}{2}\Omega^T J_b \Omega. \quad (13)$$

Therefore, the total rotational kinetic energy of the system is $$T(\Omega, \alpha, \dot{\alpha}, \theta, \dot{\theta}) = T_g(\Omega, \alpha, \dot{\alpha}) + T_r(\Omega, \alpha, \dot{\alpha}, \theta, \dot{\theta}) + T_b(\Omega). \quad (14)$$

In a compact notation, the total kinetic energy (14) of a spacecraft with a VSCMG is expressed as $$T(\gamma, \chi) = \frac{1}{2}\chi^T \mathcal{J}(\gamma)\chi, \quad (15)$$

where, $$\gamma = \begin{bmatrix} \alpha(t) \\ \theta(t) \end{bmatrix}, \chi = \begin{bmatrix} \Omega(t) \\ \dot{\gamma}(t) \end{bmatrix} \text{ and } \mathcal{J}(\gamma) = \begin{bmatrix} \Lambda(\gamma) & B(\gamma) \\ B(\gamma)^T & J_{gr}(\gamma) \end{bmatrix}. \quad (16)$$

Associated quantities of equation (16) are:

$$\Lambda(\gamma)=\Lambda_0+I_T(\gamma); \Lambda_0=J_b-(m_g+m_r)(\rho_g^\times)^2,$$

$$I_T(\gamma)=J_c(\gamma)+I_c(\alpha)-m_r\sigma\eta(\alpha)^\times\rho_g^\times, \quad (17)$$

$$J_c(\gamma)=R_g(\alpha)J_g R_g(\alpha)^T + R_r(\gamma)J_r R_r(\gamma)^T, \quad (18)$$

$$I_c(\alpha)=-m_r\sigma(\rho_g^\times\eta(\alpha)^\times + \sigma(\eta(\alpha)^\times)^2), \quad (19)$$

$$B(\gamma)=[(J_c(\gamma)+I_c(\alpha))g\ R_r J_r R_r^T \eta(\alpha)]\in\mathbf{S}^{3\times 2},$$

$$I_r(\alpha)=-m_r(\sigma\eta(\alpha)^\times)^2, \quad (20)$$

$$J_{gr}(\gamma) = \begin{bmatrix} g^T(J_c(\gamma)+I_r(\alpha))g & g^T R_r J_r R_r^T \eta(\alpha) \\ \eta(\alpha)^T R_r J_r R_r^T g & \eta(\alpha)^T R_r J_r R_r^T \eta(\alpha) \end{bmatrix} \in \mathbb{R}^{2\times 2}. \quad (21)$$

Consider the spacecraft system to be in the absence of any gravitational potential. In this case, the Lagrangian for the spacecraft with a VSCMG is given by $$L(\gamma, \chi)=T(\gamma, \chi). \quad (22)$$

Note that the Lagrangian is independent of the attitude R of the base body in this case.

Lagrangian Dynamics: Equations of Motion

The equations of motion for a spacecraft with a VSCMG are obtained using variational mechanics, taking into account the geometry of the configuration space. The action functional over a time interval [0, T] is defined as $$S(L(\gamma, \chi))=\int_0^T L(\gamma, \chi)dt, \quad (23)$$

which depends on the time evolution of the states R, $\Omega$, $\alpha$, $\dot{\alpha}$, $\theta$ and $\dot{\theta}$ in this interval. Note that $\eta$, $\dot{\eta}$ are uniquely specified by $\alpha$, $\dot{\alpha}$ and the constant vector g. In the presence of non-conservative external and internal torques to the spacecraft base body and the VSCMG, the Lagrange-d'Alembert principle is used to obtain the dynamics equations of motion for the system. Considering only non-conservative internal torques acting on the gimbal $\tau_g$ and rotor $\tau_r$ of the VSCMG, then Lagrange-d'Alembert principle for the system can be written as $$\delta S + \int_0^T \tau^T \delta\gamma dt = 0, \text{ where } \tau = \begin{bmatrix} \tau_g(t) \\ \tau_r(t) \end{bmatrix}. \quad (24)$$

Before obtaining the first variation of the action functional, the first variations of the variables $R\in SO(3)$, $\Omega\in\mathbf{S}^3$, $\eta\in\mathbf{S}^2$, and $\dot{\eta}\in T_\eta\mathbf{S}^2$ are expressed as follows:

$$\delta R = R\Sigma^\times, \delta\Omega=\dot{\Sigma}+\Omega\times\Sigma, \quad (25)$$

$$\delta\eta=\delta\alpha g^\times\eta, \delta\dot{\eta}=\delta\dot{\alpha}g^\times\eta+\delta\alpha g^\times\dot{\eta}, \quad (26)$$

where $\Sigma^\times\in\mathfrak{so}(3)$ gives a variation vector field on SO(3); thus, $\delta R$ is tangent to SO(3) at the point R. Using equation (3), the vector triple product identity, and the fact that g and $\eta$ are orthogonal vectors, the second of equations (26) can be expressed as $$\delta\dot{\eta}=\delta\dot{\alpha}g^\times\eta-\dot{\alpha}\delta\alpha\eta. \quad (27)$$

These variations must be fixed endpoint variations, such that:

$$\Sigma(0)=\Sigma(T)=0, \delta\alpha(0)=\delta\alpha(T)=0, \text{ and } \delta\theta(0)=\delta\theta(T)=0.$$

Define the following angular momentum quantities, which depend on the kinetic energy (15):

$$\prod = \frac{\partial \mathcal{L}}{\partial \Omega} = \frac{\partial T}{\partial \Omega} = \Lambda(\gamma)\Omega + B(\gamma)\dot{\gamma}, \quad (28)$$

$$p = \frac{\partial \mathcal{L}}{\partial \dot{\gamma}} = \frac{\partial T}{\partial \dot{\gamma}} = B(\gamma)^T\Omega + J_{gr}(\gamma)\dot{\gamma}. \quad (29)$$

The equations of motion obtained from applying the Lagrange-d'Alembert principle (24) are as follows:

$$\frac{d\pi}{dt} = \pi \times \Omega \tag{30}$$

$$\frac{dp}{dt} = \frac{\partial T}{\partial \gamma} + \tau \tag{31}$$

For an axis-symmetric rotor rotating about its axis of symmetry, the Lagrangian is independent of the angle $\theta$ and the scalar angular momentum $p_\theta$ would be conserved in the absence of any friction or torques acting on the rotor.

Lagrangian Dynamics: Relations Between Total Angular Momentum and VSCMG Momenta The angular momenta ($p_\alpha$ and $p_\theta$) corresponding to the two degrees of freedom of the VSCMG, are related to the angular rates $\dot{\alpha}$, $\dot{\theta}$ and spacecraft base body's angular velocity vector $\Omega$ as follows:

$$\begin{bmatrix} g^T(J_c(\gamma) + I_r(\alpha))g & g^T R_r J_r R_r^T \eta(\alpha) \\ \eta(\alpha)^T R_r J_r R_r^T g & \eta(\alpha)^T R_r J_r R_r^T \eta(\alpha) \end{bmatrix} \begin{bmatrix} \dot{\alpha} \\ \dot{\theta} \end{bmatrix} = \begin{bmatrix} p_\alpha - g^T(J_c(\gamma) + I_c(\alpha))\Omega \\ p_\theta - \eta(\alpha)^T R_r J_r R_r^T \Omega \end{bmatrix} \tag{32}$$

Equation (32) can be expressed more compactly as $$J_{gr}(\gamma)\dot{\gamma} = p - B(\gamma)^T \Omega. \tag{33}$$

Using the notation defined in (21)-(20), the total angular momentum of the spacecraft is expressed as:

$$\Pi = \underbrace{(\Lambda_0 + I_T(\gamma))\Omega}_{\text{Spacecraft basebody momenta}} + \underbrace{B(\gamma)\dot{\gamma}}_{\text{VSCMG momenta}} \tag{34}$$

where the first term is the spacecraft base body momenta and the second term is the VSCMG momenta. As described earlier, this configuration space has the structure of a fiber bundle with its base space coordinates given by the VSCMG coordinates $\alpha$ and $\theta$ and its fiber space described by the attitude R of the base body. The total angular momentum of a spacecraft with a VSCMG can be expressed in a compact way as, $$\begin{bmatrix} \Pi \\ p \end{bmatrix} = \mathcal{J}(\gamma) \begin{bmatrix} \Omega \\ \dot{\gamma} \end{bmatrix}.$$

Spacecraft with Multiple VSCMGs

The spacecraft equations of motion with one VSCMG developed previously are extended to the case of a spacecraft with multiple (n>1) VSCMGs in this section. Generalization of the relationship between internal (VSCMG) momenta and the base body's overall angular momentum for a spacecraft with n VSCMGs of the type depicted in FIG. 1b, where (n>1) is looked upon. For such a spacecraft, the configuration space Q of the dynamics is a principal bundle with base space $B = \mathbb{T}^2 \times \mathbb{T}^2 \times \ldots \mathbb{T}^2$ (n-fold product) or $B = (\mathbb{T}^2)^n$, and fiber space $F = SO(3)$. The quantities corresponding to the ith VSCMG in the set of n VSCMGs are denoted by using the superscript $(\bullet)^i$. For this system, the mass matrix is of the form $$\mathcal{J}(\Gamma) = \begin{bmatrix} \Lambda(\Gamma) & B^1(\gamma^1) & \ldots & B^n(\gamma^n) \\ B^1(\gamma^1)^T & J_{gr}^1(\gamma^1) & \ldots & 0 \\ \vdots & \vdots & \ldots & 0 \\ B^n(\gamma^n)^T & 0 & \ldots & J_{gr}^n(\gamma^n) \end{bmatrix}, \tag{35}$$

where, $$\Lambda(\Gamma) = \Lambda_0 + \sum_{i=1}^{n} I_T^i(\gamma^i), \tag{36}$$

$$\Lambda_0 = J_b - \sum_{i=1}^{n} ((m_g^i + m_r^i)([\rho_g^i]^\times)^2), \tag{37}$$

$$I_T^i(\gamma^i) = \sum_{i=1}^{n} R_g^i J_g (R_g^i)^T + R_r^i J_r (R_r^i)^T - m_r^i \sigma^i [\sigma^i (\eta^i (\alpha^i)^\times)^2 - (\eta^i ((\alpha^i)^\times (\rho_g^i)^\times + (\rho_g^i)^\times \eta^i (\alpha^i)^\times)], \tag{38}$$

and $\gamma^i = [\alpha^i \theta^i]^T \in \mathbb{T}^2$ denotes the vector of angles of the ith VSCMG. The structure of the mass matrix $\xi(\Gamma) \in \mathbb{R}^{(3+2n) \times (3+2n)}$ shows that the angular momentum contributions from each individual VSCMG to the base body's total angular momentum, are given by the $B^i(\gamma^i)$. The total angular momentum of the spacecraft with multiple VSCMGs is given by $$\Pi = \left(\Lambda_0 + \sum_{i=1}^{n} I_T^i(\gamma^i)\right)\Omega + \sum_{i=1}^{n} B^i(\gamma^i)\dot{\gamma}^i = \Lambda(\Gamma)\Omega + B(\Gamma)\dot{\Gamma}, \tag{39}$$

where $\Gamma = [\gamma^1 \gamma^2 \ldots \gamma^n]^T = _{i=1}^n [\gamma^i]^T \in \mathbb{R}^{2n}$, (40)

and $B = [B^1(\gamma^1) B^2(\gamma^2) \ldots B^n(\gamma^n)] \in \mathbb{R}^{3 \times 2n}$. (41)

The angular momentum of the ith VSCMG, denoted $p^i$, is given by $$p^i = B^i(\gamma^i)^T \Omega + J_{gr}^i(\gamma^i)\dot{\gamma}^i. \tag{42}$$

The vectors $p^i$ can be concatenated to form a vector $\mathcal{P} \in \mathbb{R}^{2n}$ $$\mathcal{P} = _{i=1}^n \|[p^i]^T. \tag{43}$$

The relation between all angular momentum and angular velocity quantities for a spacecraft with n VSCMGs is given by combining equations (35), (40) and (43) as $$\begin{bmatrix} \Pi \\ p \end{bmatrix} = \mathcal{J}(\Gamma) \begin{bmatrix} \Omega \\ \dot{\Gamma} \end{bmatrix}. \tag{44}$$

Attitude Control Using VSCMG

For spacecraft attitude stabilization or tracking using VSCMGs, one needs to ensure that the angular velocity $\Omega$ of the spacecraft base body, or alternately the base-body momentum $\Pi_b$, is controlled using the internal momentum u, which depends on the VSCMG rotation rates $\dot{\Gamma}$. One can express the total angular momentum of the spacecraft with n VSCMGs, using equations (36) and (41) as follows $$\Pi = \Pi_b + u, \text{ where } \Pi_b = \Lambda(\Gamma)\Omega \text{ and } u = \mathcal{B}(\Gamma)\dot{\Gamma}. \tag{45}$$

Therefore, $\dot{\Pi}_b = \Pi_b \times \Omega + (u \times \Omega - \dot{u}) = \Pi_b \times \Omega + \tau_{cp}$, (46)

where $\tau_{cp} = u \times \Omega - \dot{u}$ is the control torque generated by the "internal" momentum u from the VSCMGs. Note that from (46) and the attitude kinematics (9), the total momentum in an inertial frame, $\Pi_I = R\Pi = R(\Pi_b + u)$ is conserved. There are several control problems of interest for a spacecraft with n VSCMGs. For most applications, the common spacecraft attitude maneuvers are slewing to rest, pointing, and attitude tracking maneuver. The results and discussion for a slew to rest attitude control scheme (de-tumbling maneuver) for a spacecraft with multiple VSCMGs are presented in Sanyal, A., Prabhakaran, V., Leve, F., and McClamroch, N., 2013, "Geometric approach to attitude dynamics and control of spacecraft with variable speed control moment gyroscopes", in 2013 IEEE International Conference on Control Applications (CCA), pp. 556-561; and Viswanathan, S. P., Sanyal, A., Leve, F., and McClamroch, H. N., 2013. "Geometric mechanics based modeling of the attitude dynamics and control of spacecraft with variable speed control moment gyroscopes", in ASME Dynamical System Control Conference, no. DSCC 2013-4033.

Pointing Maneuver of Spacecraft with n VSCMGs

The objective of a pointing maneuver of spacecraft with n VSCMGs is to point a body-fixed imaging, communication or other instrument in a specified direction in the reference frame, where rotation about that specified body-fixed direction are not important. The control problem of pointing the spacecraft to a desired attitude in the zero level momentum set given by $\Pi_I = 0$, is considered. Therefore, equation (45) becomes $\Pi_b + u = 0$, which gives $u = -\Pi_b$ as the effective control provided by the VSCMG angular rates. To achieve this, a continuous feedback controller given by $$\tau_{cp}(R, \Omega) : SO(3) \times \mathbb{R}^3 \to \mathbb{R}^3,$$

is selected that asymptotically stabilizes the desired attitude equilibrium given by the desired attitude $R_d \in SO(3)$ and the angular velocity, $\Omega(t) = 0$.

The continuous feedback control torque for this system given by, $$\tau_{cp} = -L_v \Omega - L_p \Xi(R) \quad (47)$$

where $L_v, L_p \in \mathbb{R}^{3 \times 3}$ are positive definite matrices and the map $$\Xi(R) \triangleq \sum_{i=1}^{3} a_i e_i \times (R_d^T R \cdot e_i), \quad (48)$$

with $[e_1 \, e_2 \, e_3] = I_{3 \times 3}$ and $a = [a_1 \, a_2 \, a_3]^T$ where $a_1, a_2,$ and $a_3$ are distinctive positive integers which asymptotically stabilizes the angular velocity $\Omega(t)$ to zero vector and thereby brings the system to a desired attitude, $R_d \in SO(3)$. The almost global asymptotically stable control law given in equation (47) brings the spacecraft base-body from an arbitrary initial attitude and angular velocity to a rest attitude.

The control inputs are the VSCMG angular rates, obtained by taking the pseudo-inverse of B in equation (45), which gives the gimbal rates ($\dot{\alpha}^i$) and rotor rates ($\dot{\theta}^i$) of all VSCMGs:

$$\dot{\Gamma} = \mathcal{B}^\dagger u, \quad (49)$$

where u is obtained by integrating $\tau_{cp} = u \times \Omega - \dot{u}$. The VSCMGs need to be positioned in a way such that: $\mathcal{B} \in \mathbb{R}^{m \times n}$ in equation (49) always has full row rank; i.e., $\mathcal{B}\mathcal{B}^\dagger$ is non-singular. Then $\mathcal{B}^\dagger$ is the right inverse of $\mathcal{B}$, such that $\mathcal{B}\mathcal{B}^\dagger = I_m$. The pseudo-inverse is explicitly given by, $$\mathcal{B}^\dagger = \mathcal{B}^T(\mathcal{B}\mathcal{B}^T)^{-1}.$$

The sufficient condition for $\mathcal{B}$ to be non-singular is given below.

Null Motion of VSCMG

The rotor is often required to maintain a nominal angular rate at its breakaway velocity, to minimize the effect of static friction on the motor and bearings. This can be achieved by spinning the VSCMG gimbals and rotors, such that the vector of VSCMG rates $\dot{\Gamma}$ is in the null-space of $\mathcal{B} \in \mathbb{R}^{3 \times 2n}$; this is termed the null motion of the VSCMG assembly. The projection matrix to the null-space of $\mathcal{B}$ is given by $$\mathcal{P} = (I_{2n \times 2n} - \mathcal{B}^T(\mathcal{B}\mathcal{B}^T)^{-1}\mathcal{B}), \quad (50)$$

such that $\mathcal{P}^2 = \mathcal{P}$ and $\mathcal{B}\mathcal{P} = 0$. Let $\mathcal{N} \in \mathbb{R}^{2n}$ be the vector of preferred or nominal VSCMG rates. Then the vector of VSCMG rates with null motion is given by $$\dot{\Gamma} = \mathcal{B}^\dagger u + \dot{\Gamma}_n \text{ such that } \dot{\Gamma}_n = \mathcal{P}\mathcal{N}. \quad (51)$$

Generalized VSCMG Momenta

The momentum contribution from a VSCMG to the total angular momentum of the spacecraft (45) is given as $$u = B(\gamma)\dot{\gamma} = (J_c(\gamma) + I_c(\alpha))\dot{\alpha}g + R_r J_r R_r^T \dot{\theta}\eta(\alpha). \quad (52)$$

The inertia terms (18) and (19) are given as, $$J_c(\gamma) = R_g J_g R_g^T + R_r J_r R_r^T, \, I_c(\alpha) = -m_r \sigma(\rho_g^x \eta(\alpha)^x + \sigma(\eta(\alpha)^x)^2),$$

and therefore $$\dot{u} = \dot{\alpha} J_c(\gamma) g + \dot{\alpha} I_c(\alpha) g + \dot{\theta} R_r J_r R_r^T \eta(\alpha). \quad (53)$$

Note that $R_r = R_g \exp(\theta e_2^x)$. The first term on the expression for $\dot{u}$ can be simplified to $$J_c(\gamma)g = R_g J_g R_g^T g + R_r J_r R_r^T g, \quad (54)$$
$$= R_g J_g e_1 + R_r J_r (\cos\theta e_1 + \sin\theta e_3).$$

The second term in the equation (53) can be written as, $$\dot{\alpha} I_c(\alpha)g = \dot{\alpha}[-m_r \sigma(\rho_g^x \eta(\alpha)^x + \sigma(\eta(\alpha)^x)^2)]g \quad (55)$$
$$= m_r \sigma[\rho_g^x + \sigma\eta(\alpha)^x]\dot{\eta}(\alpha),$$

and the last term of equation (53) is, $$R_r J_r R_r^T \eta(\alpha) = R_r J_r \exp(-\theta e_2^x) R_g^T \eta(\alpha) \quad (56)$$
$$= R_r J_r \exp(-\theta(e_2^x))e_2$$
$$= R_r J_r e_2.$$

Using equations (54)-(56), the expression (53) for $\dot{u}$ leads to, $$\dot{u} = \dot{\alpha}([R_g J_g e_1 + R_r J_r(\cos\theta e_1 + \sin\theta e_3)] + m_r \sigma \rho_g^x + \sigma\eta(\alpha)^x g^x \eta(\alpha)) + \dot{\theta} R_r J_r e_2. \quad (57)$$

Any assumptions to simplify the dynamics equation of a spacecraft with VSCMG will be reflected in the equation (57).

Commonly Used Assumptions

The expression (57) for the angular momentum contribution of the VSCMGs can be reduced to the well-known expression for the angular momentum contribution from a set of CMGs of the prior art, by imposing some commonly used assumptions, as first described above: (1) the offset between the rotor center of mass and the gimbal axis in the direction of the rotor's rotation axis is zero i.e., $\sigma=0$; (2) both the gimbal and the rotor-fixed coordinate frames are their corresponding principal axes frames, the rotor is axisymmetric, and both rotor and gimbal inertias are about their respective center of masses (i.e., $J_r=J_{r_{CoM}}$ and $J_g=J_{g_{CoM}}$); (3) the gimbal frame structure has "negligible" inertia (i.e., $J_g\simeq 0$); (4) the angular rate of the gimbal frame is much smaller ("negligible") compared to the rotor angular rate about its symmetry axis (i.e., $\dot\alpha(t)<<\dot\theta(t)$); and (5) for a CMG, the speed of the rotor $\dot\theta$ is constant (i.e., the VSCMG is operated as a standard SGCMG). The following analysis shows how this series of assumptions leads to the common model for the control torque on a spacecraft due to a standard control moment gyroscope. Here, the VSCMG momenta given in the expression (53) is reduced by applying the above-summarized assumptions, one by one in sequence.

Assumption (1): VSCMG rotor center of mass is perfectly aligned with gimbal center of mass along the gimbal axis g, i.e., setting $\sigma=0$ in equation (53). This leads to the following simplification, $$u=\dot\alpha(R_g J_g e_1+R_r J_r(\cos\theta e_1+\sin\theta e_3))+\dot\theta R_r J_r e_2. \tag{58}$$

Assumption (2): By using the assumption that both the gimbal and the rotor inertias are about their respective center of masses i.e., $J_r=J_{r_{CoM}}$ and $J_g=J_{g_{CoM}}$; both the gimbal and the rotor fixed coordinate frames are their corresponding principal axes frames, and that the rotor is axisymmetric; thus, $$J_g=\text{diag}(J_{g1}, J_{g2}, J_{g3}), J_r=\text{diag}(J_{r1}, J_{r2}, J_{r1}).$$

This simplifies the expression (54) to:

$$J_c(\gamma)g=J_{g1}g+J_{r1}R_r(\cos\theta e_1+\sin\theta e_3). \tag{59}$$

Then expressing $R_r e_1$ and $R_r e_3$ as follows:

$$R_r e_1 = R_g \exp(\theta e_2^x)e_1$$
$$= g\cos\theta - (g\times\eta(\alpha))\sin\theta,$$

and $$R_r e_3 = R_g \exp(\theta e_2^x)e_3$$
$$= \cos\theta(g\times\eta(\gamma)) + \sin\theta g.$$

Substituting these in the expression for $J_c(\gamma)g$ in equation (59), gives $$J_c(\gamma)g=(J_{g1}+J_{r1})g, \tag{60}$$

which shows that this is a constant vector that is a scalar multiple of g. Further, reducing the last term of the expression (53) under the same assumption as, $$R_r J_r R_r^T \eta(\alpha) = R_r J_r e_2 = J_{r2} R_r e_2 \tag{61}$$
$$= J_{r2} R_g \exp(\theta e_2^x)e_2$$
$$= J_{r2} R_g e_2$$
$$= J_{r2} \eta(\alpha).$$

Substituting these simplified expressions under the assumptions that: (1) the offset $\sigma=0$, and (2) both the gimbal and the rotor fixed coordinate frames are their corresponding principal axes frames, and that the rotor is axisymmetric; the angular momentum due to the rotational motions of the gimbal and rotor can be expressed as:

$$u=\dot\alpha(J_{g1}+J_{r1})g+\dot\theta J_{r2}\eta(\alpha). \tag{62}$$

The rate of change of this angular momentum, which is part of the torque acting on the spacecraft's attitude dynamics due to the VSCMG, is given by $$\tau_u=\dot u=\ddot\alpha(J_{g1}+J_{r1})g+\ddot\theta J_{r2}\eta(\alpha)+\dot\alpha\dot\theta J_{r2}g^\times\eta(\alpha). \tag{63}$$

Note that even under these assumptions on the symmetric inertia distribution of the VSCMG rotor and principal coordinate frame for gimbal and rotor, the torque $\tau_u$ has components along all three axes of the coordinate frame fixed to the VSCMG gimbal. These two assumptions are commonly used, although they may not be explicitly stated.

Assumption (3): The expressions for u in equation (62) and its time rate of change can be further simplified under the additional assumptions that the gimbal inertia is "negligible", i.e., $J_g\equiv J_{g1}\simeq 0$, $$u=\dot\alpha(J_{r1})g+\dot\theta J_{r2}\eta(\alpha). \tag{64}$$

Assumption (4): The angular rate of the gimbal axis is much smaller ("negligible") compared to the rotor rate about its symmetry axis (i.e., $\dot\alpha(t)<<\dot\theta(t)$). Under these assumptions, the contribution to the total angular momentum of the spacecraft from the VSCMG is obtained as, $$u=\dot\theta J_{r2}\eta(\alpha). \tag{65}$$

The time derivative of u(t), which is part of the control torque on the spacecraft due to the VSCMG, is evaluated under these assumptions. This is evaluated to be $$\tau_u = \frac{du}{dt} = \ddot\theta J_{r2}\eta(\alpha) = \dot\alpha\dot\theta J_{r2}g^\times\eta(\alpha), \tag{66}$$

which shows that under these additional assumptions, this torque component is on the plane normal to the gimbal axis g.

Assumption (5): Finally, the assumption that the speed of the rotor $\dot\theta$ is constant, which makes the VSCMG a standard single gimbal CMG. Under the foregoing assumptions, the time rate of change of u is found to be given by $$\tau_u = \frac{du}{dt} = \dot\theta\dot\alpha J_{r2}g^\times\eta(\alpha) = \kappa\dot\alpha g^\times\gamma(\alpha), \tag{67}$$

where $\kappa=\dot\theta J_{r2}$ is a constant scalar.

Note that assumptions (3) and (4) eliminates the torque component of $\tau_u$ along the gimbal axis, as can be seen from expression (66), and this component can certainly help from a control theoretic perspective. It is important to note that these assumptions and their validity have a large effect on the condition number of B(Γ) as defined by (41). Substantial research has been directed at avoiding "singularities" of CMG arrays or clusters, where the matrix $\mathcal{B}(\Gamma)$ becomes instantaneously rank deficient. In the light of expressions (62) and (63) for u and $\tau_u$ under the assumptions (1) and (2) for VSCMGs, it is clear that the torque due to a VSCMG can be made to equal any torque vector in $\mathbb{S}^3$ by suitable choice of α, θ and their first two time derivatives, provided that actuator constraints on these time derivatives are not violated. Under assumptions (1), (2), and (5) for standard CMGs, it is clear that $\tau_u$ has no component along the $\eta(\alpha)$ axis, which is the axis of rotation (also axis of symmetry) of the flywheel. However, even in this case, unless assumptions (3) and (4) are added, the torque output $\tau_u$ can have a non-zero component along the gimbal axis. In fact, in this case, an additional assumption that the angular acceleration $\ddot{\alpha} \approx 0$ has to be appended to Assumption 1.4; note that $\dot{\alpha} \ll \dot{\theta}$ does not imply that $\ddot{\alpha}$ is "negligible." From a practical viewpoint, assumptions (1) and (2) are justifiable for most (VS)CMG designs, and under these assumptions, the expressions for the angular momentum contribution from the (VS)CMGs and its time derivative in the spacecraft body frame, are given by (62) and (63). The next section deals with singularity analysis of $\mathcal{B}(\Gamma)$ under these first two assumptions.

Singularity Analysis of Spacecraft with n VSCMGs under Assumptions (1) and (2)

Expressions for the angular momentum contribution from n VSCMGs, and the time derivative of this angular momentum, are provided here. As can be seen from these expressions, the "control influence" matrices are non-singular when either this angular momentum or its time derivative are considered as control inputs, under simple and easy-to-satisfy conditions on the gimbal axis orientations of n VSCMGs, when n≥2. This shows that with as few as two VSCMGs, one can obtain a desired output angular momentum or output torque from the VSCMGs, provided that angular rate and angular acceleration constraints on the gimbal and rotor are satisfied. Consider n VSCMGs, satisfying assumptions (1) and (2); in which case the angular momentum contribution of each VSCMG is given by (62) and the time rate of this momentum for each VSCMG is given by (63). Let $J_{g1}^k$ denote the inertia of the gimbal frame of the kth VSCMG about the gimbal axis (its symmetry axis), and let $J_r^k = \text{diag}(J_{r1}^k, J_{r2}^k, J_{r1}^k)$ denote the inertia matrix of the axisymmetric rotor of the kth VSCMG, where k=1, . . . , n for n≥2. Then equation (62) for the momentum output of the VSCMGs in the base body coordinate frame can be generalized to $$\mathcal{B}(\Gamma)\Gamma = u, \text{ where } \mathcal{B}(\Gamma) = [(J_{g1}^1 + J_{r1}^1)g_1 \; J_{r2}^1\eta_1(\alpha_1) \ldots (J_{g1}^n + J_{r1}^n)g_n \; J_{r2}^n\eta_n(\alpha_n)] \in \mathbb{R}^{3 \times 2n}, \text{ and}$$
$$\Gamma = [\alpha_1 \; \theta_1 \ldots \alpha_n \; \theta_n]^T \in \mathbb{R}^{2n}. \quad (68)$$

The following result easily follows from the structure of the influence matrix $\mathcal{B}(\Gamma)$ in the above expression.

Theorem 1. For a spacecraft with two or more VSCMGs n≥2) satisfying assumptions 1.1 and 1.2 as stated earlier, the control influence matrix $\mathcal{B}(\Gamma)$ defined by (68) has full rank if $g_j$ is neither parallel nor orthogonal to $g_k$ for any pair of VSCMGs (j, k=1, . . . , n, j≠k).

Proof. Without loss of generality, consider the case that j=1 and k=2 in the above statement. Then the control influence matrix for the VSCMG array has its first four columns given by $$(J_{g1}^1 + J_{r1}^1)g_1, \; J_{r2}^1\eta_1(\alpha_1), \; (J_{g2}^n + J_{r2}^n)g_2 \text{ and } J_{r2}^2\eta_2(\alpha_2).$$

Since $g_1$ and $g_2$ are neither parallel nor orthogonal to each other, and since $\eta_1(\alpha_1)$ is always orthogonal to $g_1$, the triad of vectors $g_1$, $\eta_1(\alpha_1)$ and $g_2$ are either non-coplanar or planar. When they are non-coplanar, they span $\mathbb{R}^3$ and hence rank ($\mathcal{B}(\Gamma)$)=3. At instants when $g_1$, $\eta_1(\alpha_1)$ and $g_2$ are co-planar, $\eta_2(\alpha_2)$ is normal to this plane since $\eta_2(\alpha_2)$ is always orthogonal to $g_2$. Therefore, in this case, Span ($g_1$, $\eta_1(\alpha_1)$, $g_2$, $\eta_2(\alpha_2)$)=$\mathbb{R}^3$ and the result follows.

The above result shows that it is possible to obtain any given angular momentum output with just a pair of VSCMGs, provided that constraints on the angular rates of the gimbal and rotor are satisfied. Now consider the time derivative of this angular momentum, which is the torque output from the VSCMGs acting on the spacecraft base body. For a single VSCMG, this torque output is given by the expression (63). For n≥2 VSCMGs, this torque output equation is given by $$\mathcal{C}(\Gamma)\gamma = \dot{u}, \text{ where } \mathcal{C}(\Gamma) = [(J_{g1}^1 + J_{r1}^1)g_1 \; J_{r2}^1\eta_1(\alpha_1)$$
$$J_{r2}^1 g_1^\times \eta_1(\alpha) \ldots (J_{g1}^n + J_{r1}^n)g_n \; J_{r2}^n\eta_n(\alpha_n)$$
$$J_{r2}^n g_n^\times \eta_n(\alpha_n)] \in \mathbb{R}^{3 \times 3n}, \text{ and } \gamma = [\ddot{\alpha}_1 \; \ddot{\theta}_1 \; \dot{\alpha}_1\dot{\theta}_1 \ldots$$
$$\alpha_n \theta_n \dot{\alpha}_n\dot{\theta}_n]^T \in \mathbb{R}^{3n}. \quad (69)$$

Note that the control influence matrix $\mathcal{C}(\Gamma)$ for the torque output has the column vectors of the influence matrix $\mathcal{B}(\Gamma)$ for the angular momentum output, in addition to additional columns that are the third axes of each of the VSCMG gimbal-fixed coordinate frames. This observation leads to the following result, which is a corollary of Theorem 1.

Corollary 2. For a spacecraft with two or more VSCMGs satisfying assumptions 1.1 and 1.2 as given earlier, the control influence matrix C(Γ)) defined by (69) has full rank if $g_j$ is neither parallel nor orthogonal to $g_k$ for any pair of VSCMGs (j, k=1, n, j≠k).

Theorem 1 holds even without Assumption (1), in which case σ≠0 provides additional directions for control that lead to better controllability properties. In Section 9, attitude control of a spacecraft using VSCMGs with and without Assumption (1) is compared.

A Geometric Variational Integrator for Spacecraft with VSCMGs

The dynamics of the multibody system consisting of the spacecraft with VSCMGs can be discretized for numerical implementation, using a variational integrator that preserves the geometry of the state space and the conserved norm of the total angular momentum. The idea behind variational integrators is to discretize the variational principles of mechanics: Hamilton's principle for a conservative system or the Lagrange-d'Alembert principle for a system with nonconservative forcing. Variational integrators are known to show good energy behavior over exponentially long time intervals and maintain conserved momentum quantities during numerical integration for systems with conserved momenta. Geometric variational integrators combine variational integrators with geometric (e.g., Lie group) methods that preserve the geometry of the configuration upon discretization. In a geometric variational integrator for multibody systems, rigid body attitude is globally represented on the Lie group of rigid body rotations. General multi-purpose numerical integration methods do not necessarily preserve first integrals or the geometry of the configuration space. Many interesting dynamical systems, including rigid body and multibody systems, evolve on Lie groups or fiber bundles on Lie groups. Lie group methods in numerical integration techniques preserve this geometry of the configuration space by discretizing the dynamics directly on the Lie group. Treatment of Lie group variational integrators for discretization of rigid body dynamics is given in the literature. Since geometric variational integrators are variational by design, they conserve momentum quantities when the system exhibits symmetry, like the magnitude of the total angular momentum Π of the spacecraft with VSCMGs.

Discretization of Equations of Motion

In this section, the discrete equations of motion for a spacecraft with one VSCMG in the form of a geometric variational integrator, corresponding to the equations of motion (30) and (31) are obtained. This is followed by generalizing these discrete equations to the case when the spacecraft has multiple VSCMGs.

Discrete Lagrangian

The discrete Lagrangian function $L_d: Q \times Q \to \mathbb{R}$ approximates the continuous Lagrangian using quadrature rules. Let $h \neq 0$ denote a fixed time step size, i.e., $t_{k+1}-t_k=h$, and consider the discrete Lagrangian $$\mathcal{L}_d \approx \int_{t_k}^{t_{k+1}} \mathcal{L} dt = \mathcal{L}(\Omega_k, R_k, \gamma_k, \dot{\gamma}_k) h = \frac{h}{2} \chi_k^T \mathcal{J}(\gamma_k) \chi_k, \quad (70)$$

$$= \frac{h}{2} [\Omega_k^T \quad \dot{\gamma}_k^T] \begin{bmatrix} \Lambda(\gamma_k) & B(\gamma_k) \\ B(\gamma_k)^T & J_{gr}(\gamma_k) \end{bmatrix} \begin{bmatrix} \Omega_k \\ \dot{\gamma}_k \end{bmatrix}.$$

For notational convenience, define $\Lambda(\gamma_k)=\Lambda_k$, $B(\gamma_k)=B_k$ and $J_{gr}(\gamma_k)=J_{gr,k}$.

Discretization of Kinematics

Consider the discrete analogue of the continuous spacecraft attitude kinematics equation (9) given by, $$R_{k+1}=R_k F_k, \quad (71)$$

such that, $F_k = \exp(h\Omega_k^\times)$. (72)

The first variation of both sides of equation (72) is obtained under the assumption that $\delta\Omega_k^\times$ commutes with $\Omega_k^\times$, i.e., the Lie bracket $[\delta\Omega_k^\times, \Omega_k^\times]=0$, as follows:

$$\delta F_k = h\delta\Omega_k^\times \exp(h\Omega_k^\times) = h\delta\Omega_k^\times F_k.$$

The variation of $F_k$ can be computed from equation (25) and (71) as $\delta F_k = -\Sigma_k^\times F_k + F_k \Sigma_{k+1}^\times$, then $$\delta\Omega_k^\times = \frac{1}{h}\delta F_k F_k^T = \frac{1}{h}(-\Sigma_k^\times F_k + F_k \Sigma_{k+1}^\times)F_k^T, \quad (73)$$

$$= \frac{1}{h}(-\Sigma_k^\times + (F_k\Sigma_{k+1})^\times),$$

$$\delta\Omega_k = \frac{1}{h}(F_k\Sigma_{k+1} - \Sigma_k).$$

The VSCMG angular rates are approximated using the trapezoidal rule as:

$$\dot{\gamma}_k \simeq \frac{\gamma_{k+1}-\gamma_k}{h} \text{ and its variation, } \delta\dot{\gamma}_k = \frac{1}{h}(\delta\gamma_{k+1}-\delta\gamma_k). \quad (74)$$

Discretization of Dynamics

Consider the discrete Lagrangian (70) and the associated action sum $$S_d = \sum_{k=0}^{N-1} \mathcal{L}_d,$$

then the discrete Lagrange-dAlembert principle states that $$\sum_{k=0}^{N-1}(\delta\mathcal{L}_d + h\tau_d^T\delta\gamma_k) = 0. \quad (75)$$

The first variation of the discrete Lagrangian (70) is $$\delta\mathcal{L}_d = h[\Omega_k^T \quad \dot{\gamma}_k^T]\begin{bmatrix} \Lambda_k & B_k \\ B_k^T & J_{gr,k} \end{bmatrix}\begin{bmatrix} \delta\Omega_k \\ \delta\dot{\gamma}_k \end{bmatrix} + \frac{\partial}{\partial\gamma_k}\{\mathcal{L}_d\}\delta\gamma_k, \quad (76)$$

$$= h(\Lambda_k\Omega_k + B_k\dot{\gamma}_k)^T\delta\Omega_k + h(B_k^T\Omega_k + J_{gr,k}\dot{\gamma}_k)^T\delta\dot{\gamma}_k +$$

$$M_k(\gamma_k, \dot{\gamma}_k, \Omega_k)\delta\gamma_k,$$

$$= h\Pi_k^T\delta\Omega_k + hp_k^T\delta\dot{\gamma}_k + M_k\delta\gamma_k,$$

where the discrete total angular momentum of the spacecraft ($\Pi_k$) is obtained using equation (74) as $$\Pi_k = \Lambda_k\Omega_k + B_k\dot{\gamma}_k = \Pi_{b,k} + u_k, \quad (77)$$

and the internal momentum quantities are given by $$p_k = B_k^T\Omega_k + J_{gr,k}\dot{\gamma}_k, \quad M_k = \frac{\partial\mathcal{L}_d}{\partial\gamma_k}, \text{ and}$$

$$u_k = \frac{1}{h}B_k(\gamma_{k+1}-\gamma_k)$$

Substituting equation (73), (74) and (76) into the Lagrange-dAlembert principle (75) gives, $$\sum_{k=0}^{N-1}\left[\left(\prod_{k+1}^T F_k \Sigma - \Sigma\right) + p_k^T(\delta\gamma_{k+1}-\delta\gamma_k) + M_k\delta\gamma_k + h\tau_{\gamma,k}^T\delta\gamma_k\right] = 0. \quad (78)$$

Using the fact that the variations $\Sigma_k$ and $\delta\gamma_k$ vanish at the endpoints (for k=0 and k=N) and re-indexing the discrete action sum, equation (78) can be re-expressed as $$\sum_{k=0}^{N-1}\left[\left(\prod_{k-1}^T F_{k-1} - \prod_k^T\right)\Sigma_k + (p_{k-1}^T - p_k^T + M_k + h\tau_{\gamma,k}^T)\delta\gamma_k\right] = 0. \quad (79)$$

Since the above expression is true for arbitrary $\Sigma_k$ and $\delta\gamma_k$, one obtains the following relations for the discrete dynamics:

$$\Pi_{k+1} = F_k^T\Pi_k, \quad (80)$$

$$P_{k+1} = P_k + M_{k+1} + h\tau_{\gamma,k+1}. \quad (81)$$

This discrete dynamics of the spacecraft with one VSCMG, given by equation (80) and (81), is generalized to the case of multiple VSCMGs in a manner similar to that in section 4. The discrete analog of the spacecraft attitude dynamics with multiple VSCMGs is obtained from equations (77) and (80), as follows:

$$\Pi_{b,k+1} = F_k^T\Pi_{b,k} + F_k^T u_k - u_{k+1}. \quad (82)$$

Geometric Variational Integrator Algorithm

The algorithm for the geometric variational integrator (GVI) routine is as follows:
1. Initialize $F_k = \exp(h\Omega_k^\times)$ and $\Gamma_{k+1} = h\dot{\Gamma}_k + \Gamma_k$;
2. Compute $\mathcal{B}_{k+1}$ and $\Lambda_{k+1}$ as functions of $\Gamma_{k+1}$;
3. Equate, $F_k^T u_k - u_{k+1} = h\tau_{cp,k} = -L_v\Omega_k - L_p(a_i e_i \times (R_d^T R_k e_i))$ and substitute in equation (82);
4. Compute, $u_{k+1} = F_k^T u_k - h\tau_{cp,k}$;
5. Update VSCMG rates one time step forward as: $\dot{\Gamma}_{k+1} = \mathcal{B}_{k+1}^\dagger u_{k+1} + (I_{2n\times 2n} - \mathcal{B}_{k+1}^\dagger \mathcal{B}_{k+1})N$;
6. Obtain $\Pi_{b,k+1}$ from dPibpl and $\Omega_{k+1} = \Lambda_{k+1}^{-1}\Pi_{b,k+1}$;
7. Loop through steps 1 to 7 for all k.

This algorithm provides an explicit geometric variational integrator, which is used in the following section to numerically simulate the dynamics of a spacecraft with multiple VSCMGs, while maintaining a constant magnitude for the total angular momentum ($\|\Pi_{k+1}\|=\|\Pi_k\|$ by equation (80)) and preserving the geometry of the configuration space.

Numerical Simulation Results

In this section, the feedback control law given by equation (47) is numerically validated on the attitude dynamics of a spacecraft with three VSCMGs in a tetrahedron configuration.

Example Case of a Spacecraft with Three VSCMG in Tetrahedron Configuration

Figure 2A:
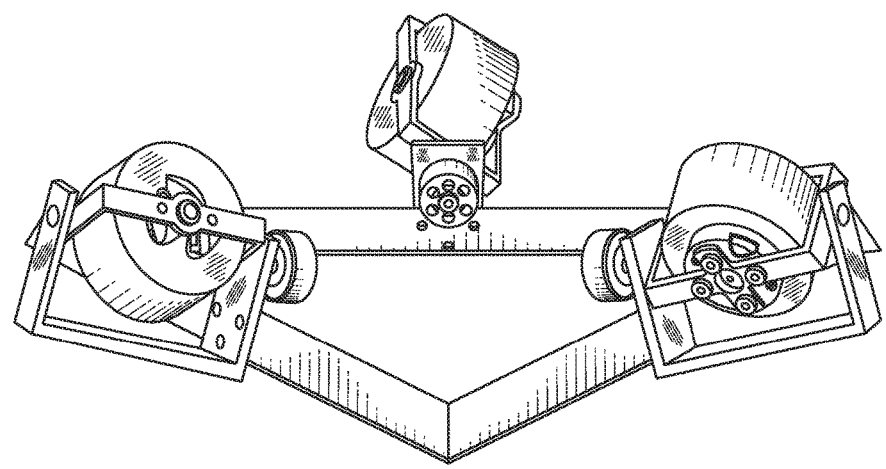
FIG. 2a is a CAD rendering of three VSCMGs in a tetrahedron configuration.
Figure 2B:
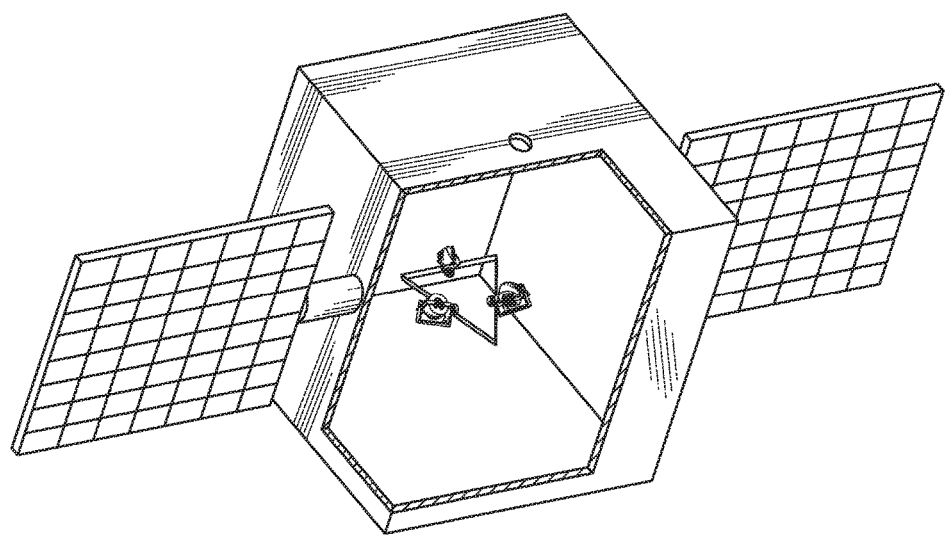
FIG. 2b shows a satellite comprising three VSCMG actuators.
Figure 2C:
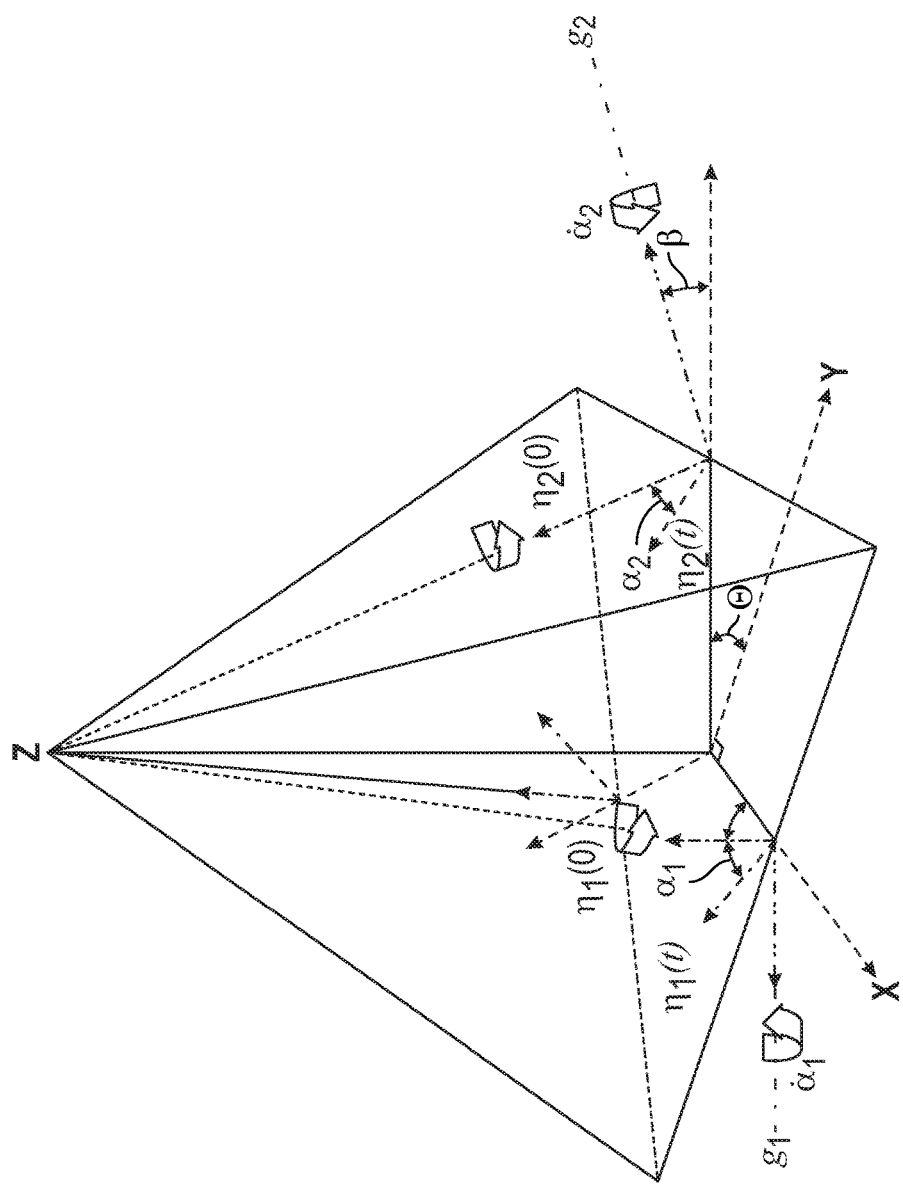
FIG. 2c is a vector representation of three VSCMGs in the tetrahedron configuration with respect to the base body coordinate frame [XYZ].

A spacecraft with three VSCMGs in a tetrahedron configuration as shown in FIGS. 2a and 2b is considered in this section. Each VSCMG has identical gimbal and rotor mass, i.e. $m_g^1=m_g^2=m_g^3=m_g$ and $m_r^1=m_r^2=m_r^3=m_r$, respectively. From FIG. 2c, the rotor axes $\eta_{1,2,3}$ and gimbal axes $g_{1,2,3}$ corresponding to $VSCMG_{1,2,3}$, respectively are resolved in the spacecraft base body frame. The center of mass of the spacecraft base body is kept aligned to the plane containing the intersection of g and η.

For the tetrahedron mount of three single-gimbal VSC-MGs with skew angle of β as illustrated in FIG. 2, the gimbal-axis vectors can be represented as, $$g_1 = \begin{bmatrix} C\beta \\ 0 \\ S\beta \end{bmatrix}; g_2 = \begin{bmatrix} -S\Theta C\beta \\ C\Theta C\beta \\ S\beta \end{bmatrix} \text{ and } g_3 = \begin{bmatrix} -S\Theta C\beta \\ -C\Theta C\beta \\ S\beta \end{bmatrix}. \tag{83}$$

Similarly, the rotor axis $\eta(0)$ at time t=0 can be represented as, $$\eta_1(0) = \begin{bmatrix} -S\beta \\ 0 \\ C\beta \end{bmatrix}; \eta_2(0) = \begin{bmatrix} -S\beta S\Theta \\ C\Theta S\beta \\ C\beta \end{bmatrix} \text{ and } \eta_3(0) = \begin{bmatrix} S\beta S\Theta \\ C\Theta S\beta \\ C\beta \end{bmatrix}. \tag{84}$$

Here, $s((\alpha/\beta)/\Theta) \equiv \sin((\alpha/\beta)/\Theta)$ and $C((\alpha/\beta)/\Theta) \equiv \cos((\alpha/\beta)/\Theta)$, $$\Theta = \left|\frac{\pi}{2} - \frac{2\pi}{n}\right|,$$

for tetrahedron, $$n = 3 \Rightarrow \Theta = \frac{\pi}{6}$$

radian or 30°.

The time varying $\eta(t)$, as a function of time about g is obtained using equation (1) and rotation matrices $R_g^i$ and $R_r^i$ are given as, $R_g^i = [g_i \; \eta_i \; g_i^\times \eta_i]$ and $R_r^i = R_g^i \exp(\theta_i e_2^\times)$; i=1,2,3.

From Corollary 2, the tetrahedron configuration of VSCMG in the spacecraft base body ensures the existence of non-singular $\mathcal{B}$ matrix for all time t≥0. The skew angle β is chosen, such that $g_j$ is neither parallel nor orthogonal to $g_k$ for all three VSCMGs (j, k=1,2,3; j≠k).

Results for a Simulated Pointing Maneuver

Figure 3A:
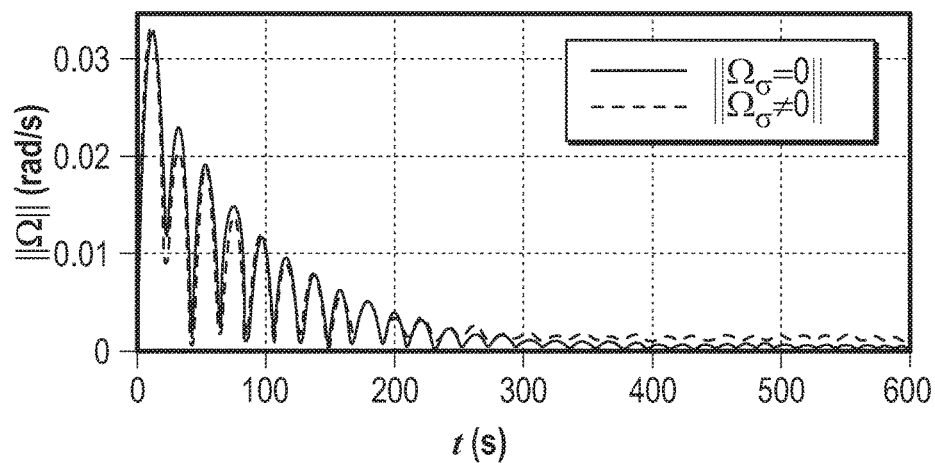
FIG. 3a is a graph of the norm of angular velocity of the spacecraft base-body.
Figure 3B:
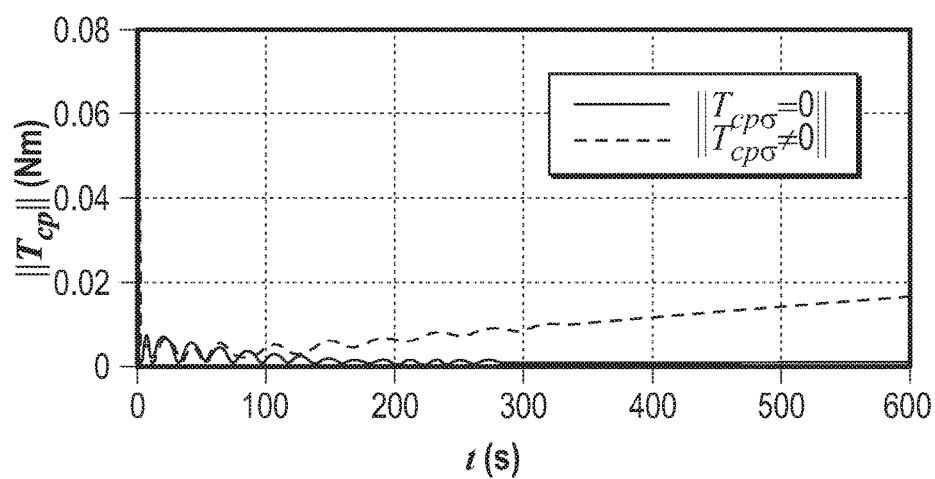
FIG. 3b is a graph of the norm of control torque.
Figure 3C:
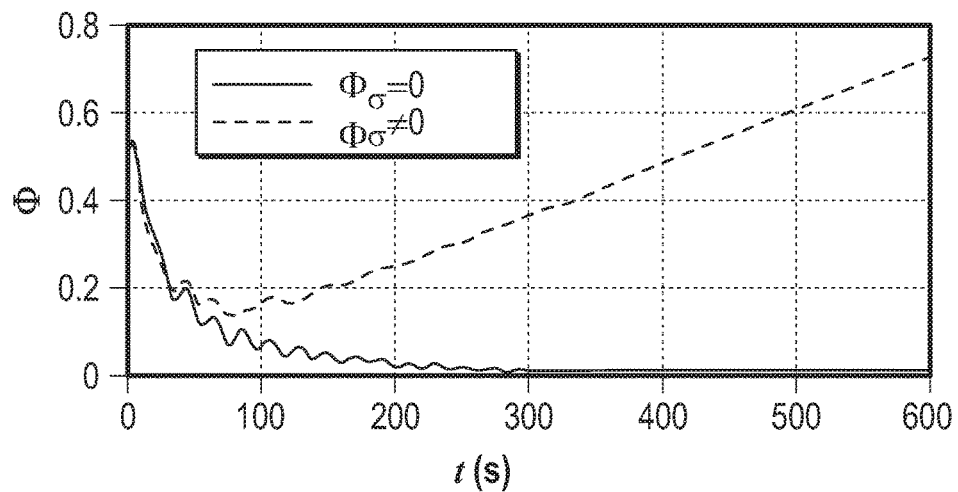
FIG. 3c is a graph of attitude stabilization error.
Figure 3D:
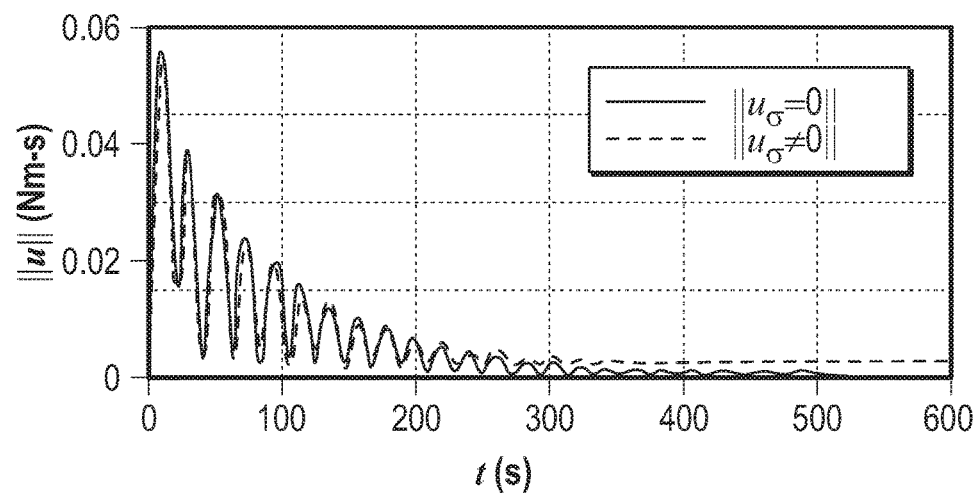
FIG. 3d is a graph of the norm of VSCMG angular momentum, output $u = \mathcal{B}\, \dot{\Gamma}$.

The geometric variational integrator scheme given above and the simulation parameters from the table shown in FIG. 7 are used to obtain numerical results for a simulated pointing maneuver. The initial attitude is chosen to be a 1 radian rotation about the inertial axis $[-1/3 \; 1/3 \; 0.8/3]^T$. The full attitude pointing maneuver transfers the initial attitude to a desired final attitude, asymptotically. The control inputs are provided in terms of VSCMG angular rates, i.e. the vector $\dot{\Gamma}$. This vector of VSCMG rates is obtained using the GVI algorithm given above. The VSCMG angular momentum contribution converges to zero as the gimbals and rotors converge to their prescribed nominal rates, i.e., $\dot{\Gamma}$ converges to $\dot{\Gamma}_n$ in the null space of $\mathcal{B}$; this helps in avoiding "zero crossing" of the gimbal and rotor drive motors. In the first set of simulation results shown in FIG. 3, control schemes based on Assumption (1) σ32 0) are applied when (σ=0) and when σ≠0, and the open loop simulation results are compared. For this maneuver, FIG. 3a compares the time response of the norm of spacecraft total angular velocity for these two cases, and FIG. 3b compares the control torque norms generated by the control law. The importance of this generalized VSCMG model is demonstrated by FIG. 3c; the spacecraft actuated by VSCMG with non-zero rotor offset is not stabilized, as the gimbal and rotor are not spinning in the null space of $\mathcal{B}_{\sigma \neq 0}$ (note that $\mathcal{B}_{\sigma \neq 0} \neq \mathcal{B}_{\sigma=0}$). As (VS)CMG are mainly used for precise pointing application of the spacecraft, even a small change in the dynamics can lead to a considerable deviation in pointing accuracy. FIG. 3d shows the VSCMG angular momenta with and without rotor offset. From these results, it is inferred that a small misalignment of the rotor CoM with gimbal CoM (σ=0.005 m) can greatly affect the dynamics leading to failure in achieving the control objectives.

Figure 4A:
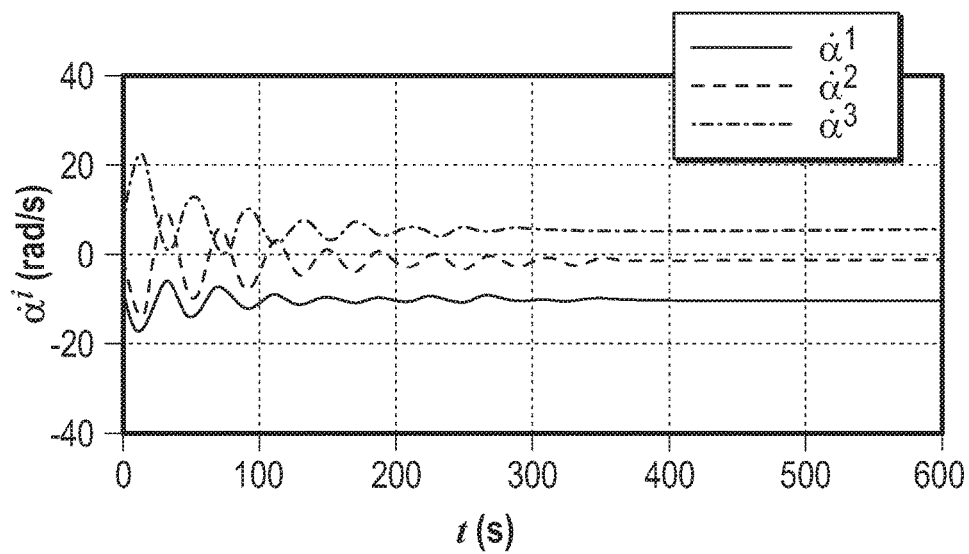
FIG. 4a is a graph showing the VSCMG gimbal rate at $\sigma=0$.
Figure 4B:
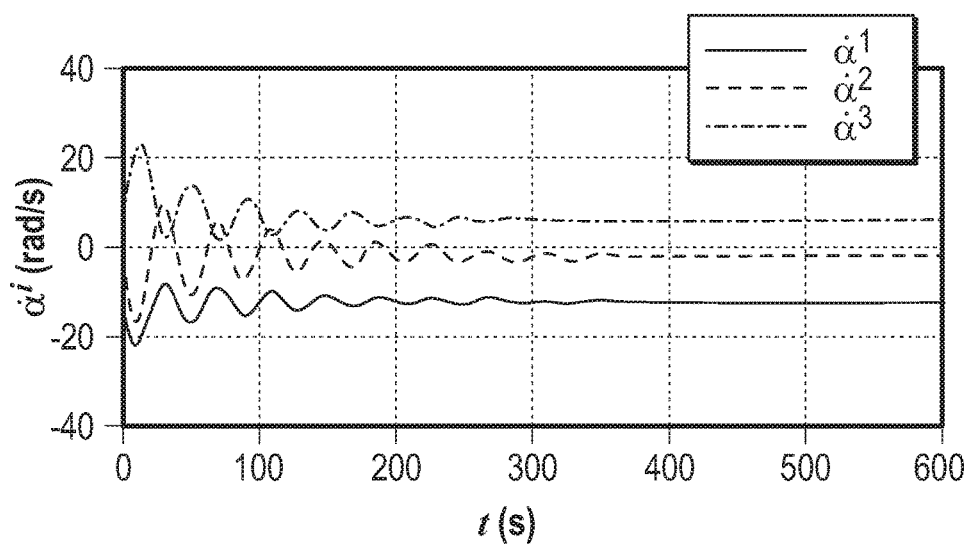
FIG. 4b is a graph showing the VSCMG gimbal rate at $\sigma=0.005$ m.
Figure 5A:
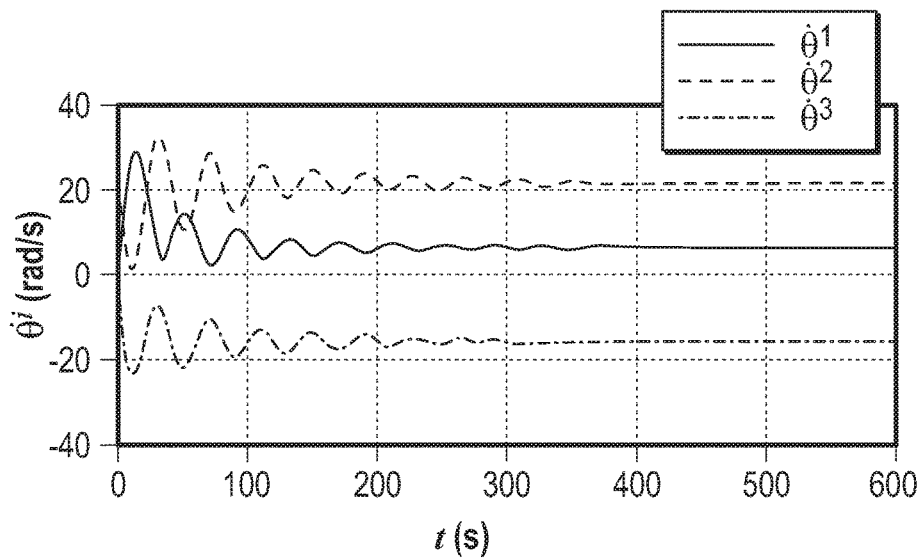
FIG. 5a is a graph showing the VSCMG rotor rate at $\sigma=0$.
Figure 5B:
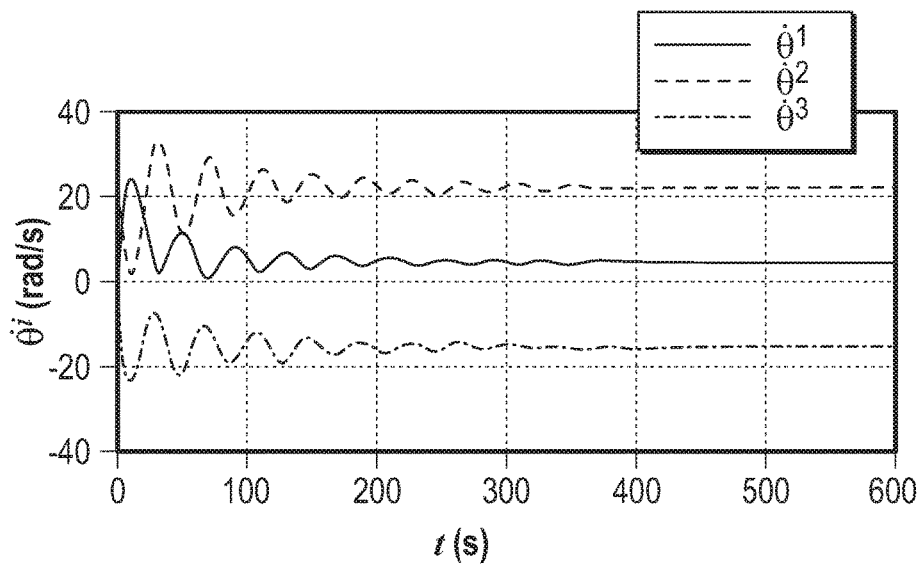
FIG. 5b is a graph showing the VSCMG rotor rate at $\sigma=0.005$ m.
Figure 6A:
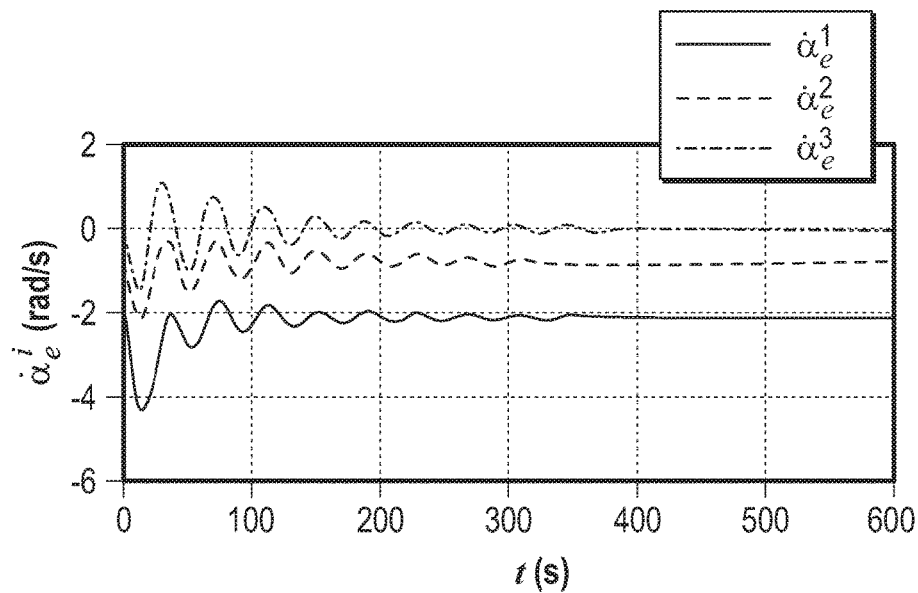
FIG. 6a is a graph showing the difference in the gimbal rate between zero offset VSCMGs and nonzero-offset VSCMGs in corresponding locations in a tetrahedron configuration, i.e. $\dot{\alpha}_e^i = \dot{\alpha}_{\sigma=0}^i - \dot{\alpha}_{\sigma\neq 0}^i$.
Figure 6B:
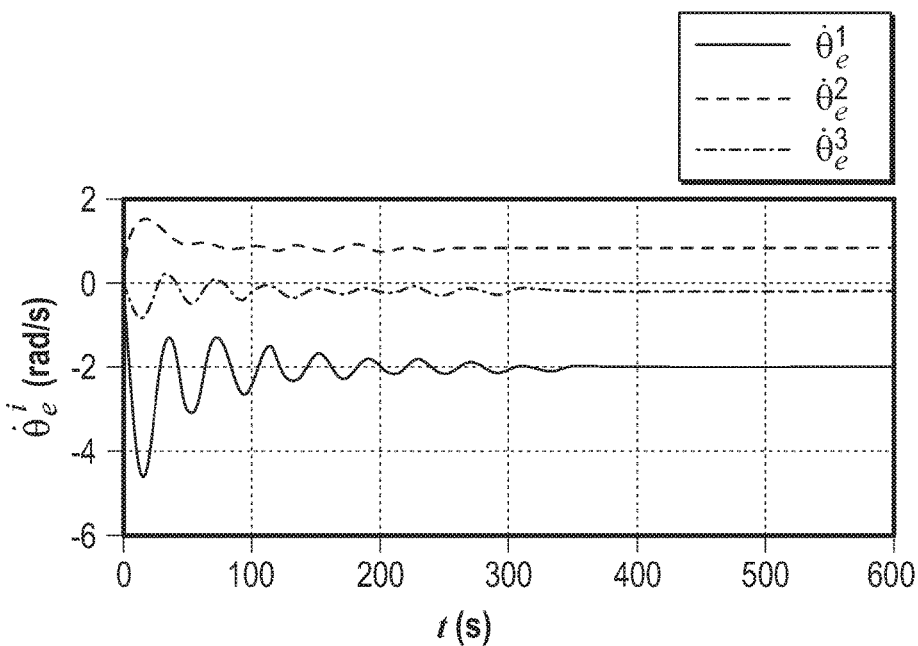
FIG. 6b is a graph showing the difference in the rotor rate between three zero offset VSCMG and a nonzero-offset VSCMG in corresponding locations in a tetrahedron configuration, i.e. $\dot{\theta}_e^i = \dot{\theta}_{\sigma=0}^i - \dot{\theta}_{\sigma\neq 0}^i$.
Figure 8A:
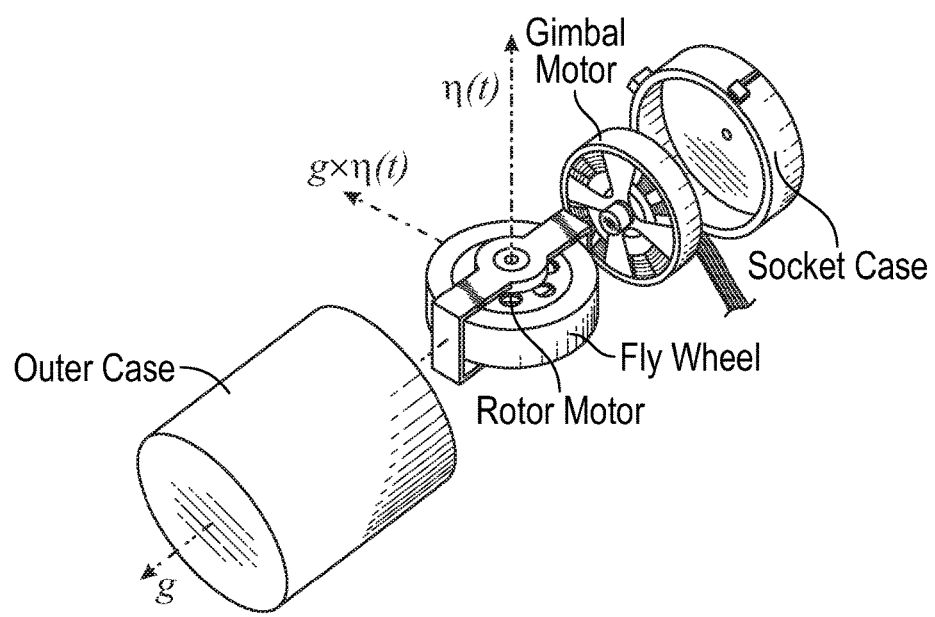
FIG. 8a shows an embodiment of a micro-VSCMG for a 1U cubesat.
Figure 8B:
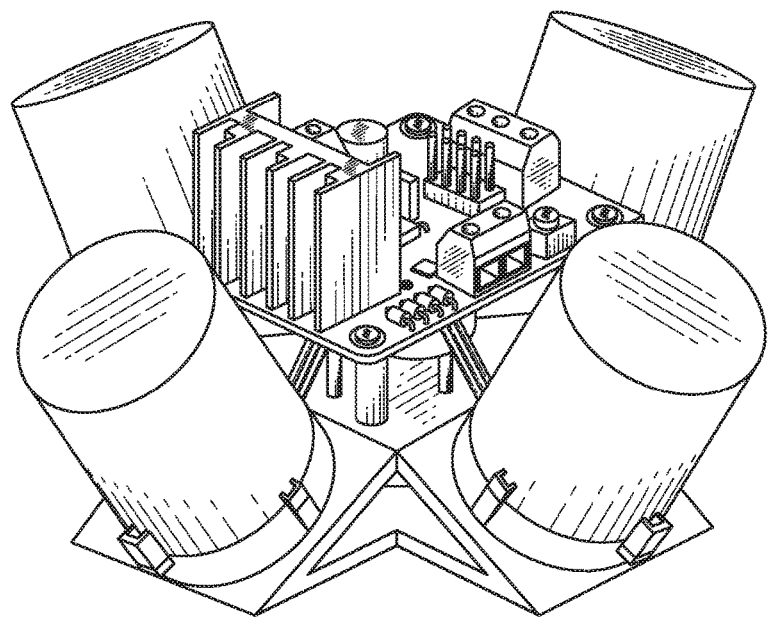
FIG. 8b shows a 1U cubesat comprising a plurality of VSCMG's of the present invention.

FIGS. 4a and 4b compare the time evolution of each VSCMG's gimbal rates for rotor offsets of σ=0 and σ=0.005 m, respectively. The difference in these gimbal rates is given in FIG. 6a. Similarly, VSCMG rotor rates with zero rotor offset (FIG. 5a) and non-zero offset (FIG. 5b) are plotted and the difference in the rotor rates for these two cases is plotted in FIG. 6b. These results confirm the reduction in the gimbal and rotor rates of the VSCMG with non-zero rotor offset to that of the VSCMG with zero rotor offset. Based on the numerical results, one can see that the generalized dynamics model can lead to better control performance when certain simplifying assumption(s) do not hold in practice.

The dynamics model of a spacecraft with a generalized model of one VSCMG with an offset between the rotor center of mass and gimbal center of mass along the gimbal axis is presented. The model is then generalized to a spacecraft with n such VSCMGs. Equations of motion are expressed in terms of angular momentum variables of the spacecraft's attitude motion and the rotational degrees of freedom of the VSCMGs. Thereafter, certain commonly used assumptions are applied to the generalized VSCMG model, which reduces it to the conventional model. Sufficient conditions for non-singular VSCMG steering under some of these assumptions are stated. An attitude pointing control scheme for a spacecraft using only VSCMGs is obtained and the control scheme is compared for VSCMGs with zero and non-zero rotor offset. The overall dynamics is numerically simulated, when there is no gravity or external moment, and when the overall angular momentum of the system is zero. The continuous equations of motion for this system are discretized in the form of a geometric variational integrator, for numerical simulation of the feedback system. The numerical simulation results confirm the stabilizing properties of the VSCMG-based attitude control and show improved pointing control performance when the VSCMG model takes into account an existing rotor offset. Embodiments of the VSCMGs with CoM offsets will have greater tolerance to misalignments and manufacturing imperfections leads to lesser costs and faster development times than current (VS)CMGs. They will be more durable and adaptive; i.e. they will not lead to spacecraft pointing failures due to misalignment, and can also identify and correct for misalignments that may occur in use. They are more efficient, since they require lower power consumption per unit torque produced, in comparison to traditional designs. And they can be scaled from very small sizes (such as cubesats) to very large sizes (such as the International Space Station).

Although the invention has been described in detail with particular reference to the disclosed embodiments, other embodiments can achieve the same results. Variations and modifications of the present invention will be obvious to those skilled in the art and it is intended to cover all such modifications and equivalents. The entire disclosures of all patents and publications cited above are hereby incorporated by reference.

What is claimed is:

1. A variable speed control moment gyroscope (VSCMG) comprising:
    a gimbal frame;
    a flywheel; and
    an offset between a rotational axis of said gimbal frame and a radial line passing through a center of mass of said flywheel, said offset in a direction of said flywheel's rotation axis, wherein said radial line is parallel to said rotational axis;
    wherein said VSCMG does not comprise a control singularity in a map between a gimbal rotation rate and/or a flywheel rotation rate and angular momentum or torque produced by said VSCMG.

2. The VSCMG of claim 1 wherein angular momentum and torque produced by said VSCMG increases with a distance of said VSCMG from a center of mass of a spacecraft bus.

3. The VSCMG of claim 1 wherein a gimbal coordinate frame is not the same as its principal axis frame.

4. The VSCMG of claim 1 wherein a flywheel fixed coordinate frame is not the same as its principal axis frame.

5. The VSCMG of claim 1 wherein a gimbal inertia is not about said rotational axis of said gimbal frame.

6. The VSCMG of claim 1 wherein said offset is at least an order of magnitude greater than an offset between said rotational axis of said gimbal frame and said center of mass of said flywheel occurring during manufacture of said VSCMG due to manufacturing tolerances.

7. The VSCMG of claim 6 wherein said offset is specified in a design of said VSCMG.

8. The VSCMG of claim 1 wherein said flywheel is axisymmetric.

9. The VSCMG of claim 1 wherein said flywheel rotates with a variable angular speed.

* * * * *